US012679556B2

(12) United States Patent

Inuma et al.

(10) Patent No.: US 12,679,556 B2
(45) Date of Patent: Jul. 14, 2026

(54) VEHICLE-RELATED TIME ALERT DEVICE, SYSTEM, AND METHOD

(71) Applicant: Rakuten Group, Inc., Tokyo (JP)

(72) Inventors: Takayoshi Inuma, Tokyo (JP); Jun Takizawa, Chino (JP)

(73) Assignee: Rakuten Group, Inc., Tokyo (JP)

( * ) Notice: Subject to any disclaimer, the term of this patent is extended or adjusted under 35 U.S.C. 154(b) by 57 days.

(21) Appl. No.: 18/544,981

(22) Filed: Dec. 19, 2023

(65) Prior Publication Data

US 2024/0208670 A1     Jun. 27, 2024

(30) Foreign Application Priority Data

Dec. 22, 2022     (JP) ................................. 2022-205813

(51) Int. Cl.
| | |
|---|---|
| B64D 45/00 | (2006.01) |
| G06Q 10/0631 | (2023.01) |
| G08G 5/55 | (2025.01) |
| G08G 5/57 | (2025.01) |

(52) U.S. Cl.
CPC ......... B64D 45/00 (2013.01); G06Q 10/0631 (2013.01); G08G 5/55 (2025.01); G08G 5/57 (2025.01)

(58) Field of Classification Search
CPC . B64D 45/00; G08G 5/57; G08G 5/22; G08G 5/52; G08G 5/55; G06Q 10/0631; G06Q 10/083; G06Q 30/0601; G09G 3/04; G09G 2380/10; G07C 5/008; B64F 1/18
See application file for complete search history.

(56) References Cited

U.S. PATENT DOCUMENTS

| | | | | |
|---|---|---|---|---|
| 8,355,936 | B2 * | 1/2013 | Altaf | G06Q 10/047 |
| | | | | 705/5 |
| 9,418,548 | B2 * | 8/2016 | Ohdachi | G09G 3/04 |
| 2002/0065703 | A1 * | 5/2002 | Garg | G06Q 10/10 |
| | | | | 705/7.12 |
| 2018/0108260 | A1 | 4/2018 | Kuhara | |
| 2020/0231183 | A1 | 7/2020 | Akita | |
| 2020/0294401 | A1 * | 9/2020 | Kerecsen | G08G 1/205 |

FOREIGN PATENT DOCUMENTS

| | | | |
|---|---|---|---|
| JP | 2017-78704 | A | 4/2017 |
| JP | 2020-116999 | A | 8/2020 |
| JP | 2022-87355 | A | 6/2022 |
| JP | 7143485 | B1 | 9/2022 |

OTHER PUBLICATIONS

JP 2017 078704A Specification translation (Year: 2017).*
JP 7143485 Specification translation (Year: 2022).*

* cited by examiner

*Primary Examiner* — John A Tweel, Jr.
(74) *Attorney, Agent, or Firm* — Sughrue Mion, PLLC

(57) ABSTRACT

An alert device includes a data communication circuit configured to receive, from an alert control device, time information representing a vehicle-related time that is a time relating to a vehicle. The alert device also includes a storer that is a memory or a storage device, the storer being configured to store the received time information, and an alertor configured to execute an alert relating to the vehicle, based on the vehicle-related time represented by the stored time information.

20 Claims, 15 Drawing Sheets

FIG. 4

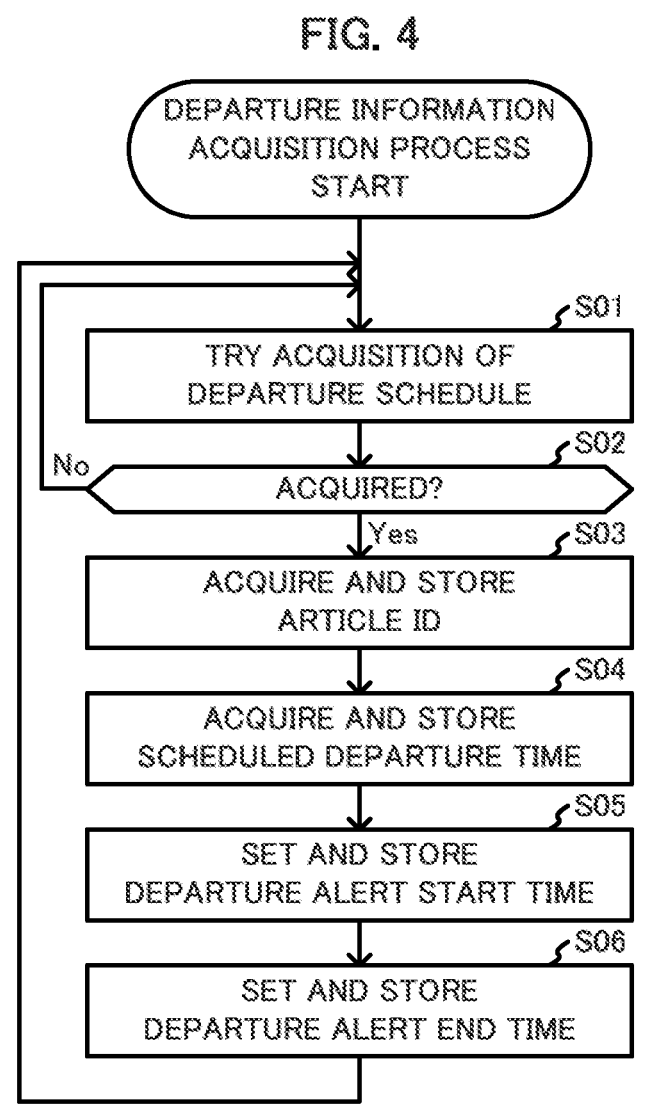

DEPARTURE INFORMATION
ACQUISITION PROCESS
START

S01

TRY ACQUISITION OF
DEPARTURE SCHEDULE

S02

ACQUIRED?    No

Yes    S03

ACQUIRE AND STORE
ARTICLE ID

S04

ACQUIRE AND STORE
SCHEDULED DEPARTURE TIME

S05

SET AND STORE
DEPARTURE ALERT START TIME

S06

SET AND STORE
DEPARTURE ALERT END TIME

Figure 8:
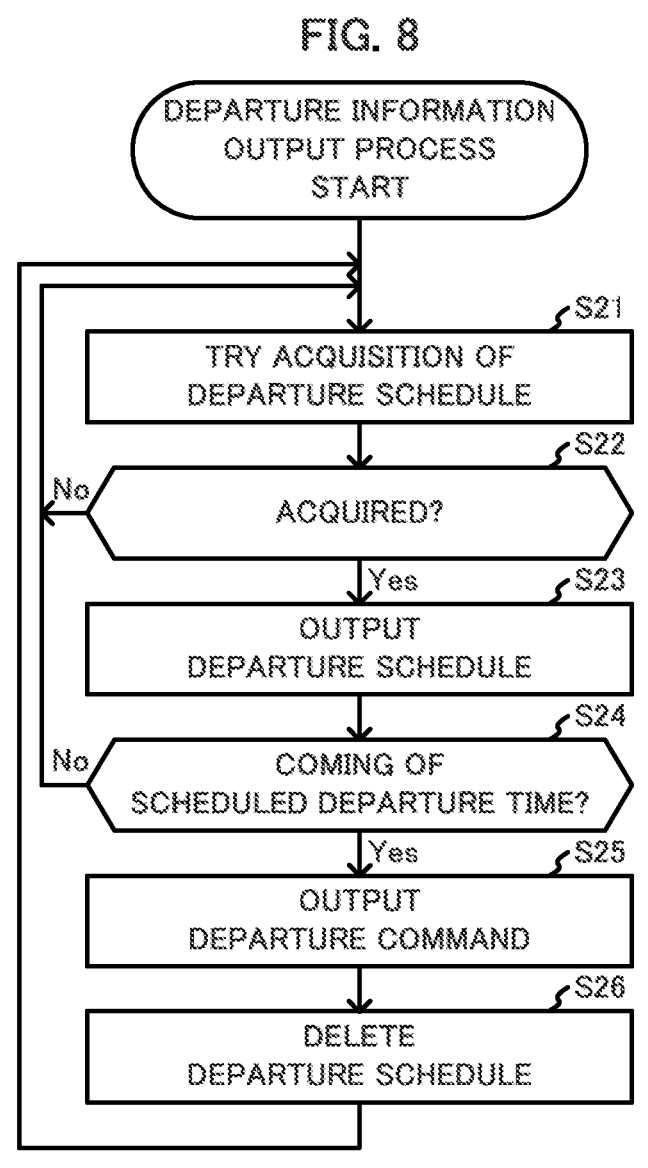

DEPARTURE INFORMATION
OUTPUT PROCESS
START

S21
TRY ACQUISITION OF
DEPARTURE SCHEDULE

S22
ACQUIRED? — No

Yes
S23
OUTPUT
DEPARTURE SCHEDULE

S24
No — COMING OF
SCHEDULED DEPARTURE TIME?

Yes
S25
OUTPUT
DEPARTURE COMMAND

S26
DELETE
DEPARTURE SCHEDULE

Figure 10:
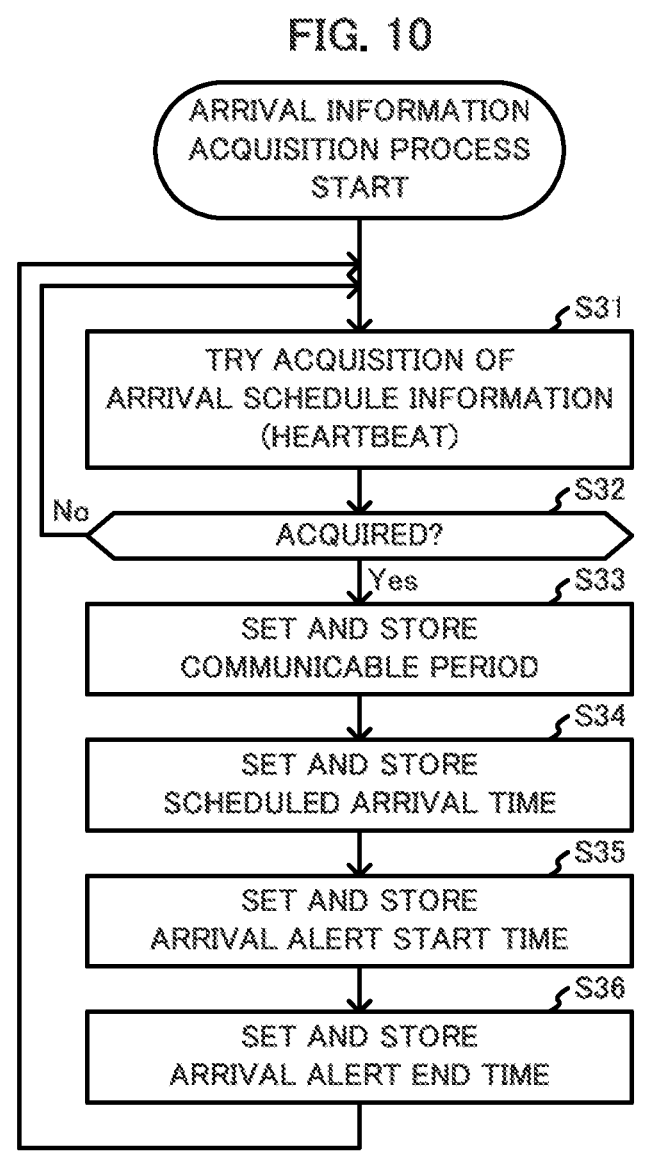

ARRIVAL INFORMATION
ACQUISITION PROCESS
START

S31
TRY ACQUISITION OF
ARRIVAL SCHEDULE INFORMATION
(HEARTBEAT)

S32
No — ACQUIRED?

Yes — S33
SET AND STORE
COMMUNICABLE PERIOD

S34
SET AND STORE
SCHEDULED ARRIVAL TIME

S35
SET AND STORE
ARRIVAL ALERT START TIME

S36
SET AND STORE
ARRIVAL ALERT END TIME

VEHICLE-RELATED TIME ALERT DEVICE, SYSTEM, AND METHOD

CROSS-REFERENCE TO RELATED APPLICATIONS

This application claims the benefit of Japanese Patent Application No. 2022-205813, filed on Dec. 22, 2022, the entire disclosure of which is incorporated by reference herein.

FIELD OF THE INVENTION

The present disclosure relates to an alert device, a system, and a method.

BACKGROUND OF THE INVENTION

A small-sized portable terminal that notifies landing of a vehicle, such as a drone, by communication with a control device such as air traffic control device is known in the art (for example, Unexamined Japanese Patent Application Publication No. 2022-87355).

SUMMARY OF THE INVENTION

However, in the small-sized portable terminal of Unexamined Japanese Patent Application Publication No. 2022-87355, there is a problem that when the quality of communication with the control device is lowered, a decrease in accuracy of an alert relating to the vehicle cannot be suppressed thereafter.

Thus, the present disclosure has been made in consideration of the point, and an objective of the disclosure is to provide an alert device, a system, and a method, which can suppress a decrease in accuracy of an alert relating to the vehicle, after the quality of communication with a control apparatus deteriorates.

In order to achieve the above objective, an alert device according to a first aspect of the present disclosure includes:

a communication circuit configured to receive, from a control device, time information representing a vehicle-related time that is a time relating to a vehicle;

a storer that is a memory or a storage device, the storer being configured to store the received time information; and an alertor configured to execute an alert relating to the vehicle, based on the vehicle-related time represented by the stored time information.

BRIEF DESCRIPTION OF DRAWINGS

A more complete understanding of this application can be obtained when the following detailed description is considered in conjunction with the following drawings, in which:

FIG. 4 is a flowchart illustrating an example of a departure information acquisition process that the alert device executes;

FIG. 7 is a hardware configuration diagram illustrating one configuration example of an alert control device;

FIG. 8 is a flowchart illustrating an example of a departure information output process that the alert control device executes;

FIG. 9 is a hardware configuration diagram illustrating one configuration example of a control device of the vehicle;

FIG. 10 is a flowchart illustrating an example of an arrival information acquisition process that the alert device executes;

FIG. 11B is a second half of the flowchart illustrating the example of the arrival alert control process that the alert device according to Modification 16 of the embodiment executes;

FIG. 12B is a second half of the flowchart illustrating the example of the arrival alert control process that the alert device according to Modification 20 of the embodiment executes.

DETAILED DESCRIPTION OF THE INVENTION

Embodiment

Figure 1:
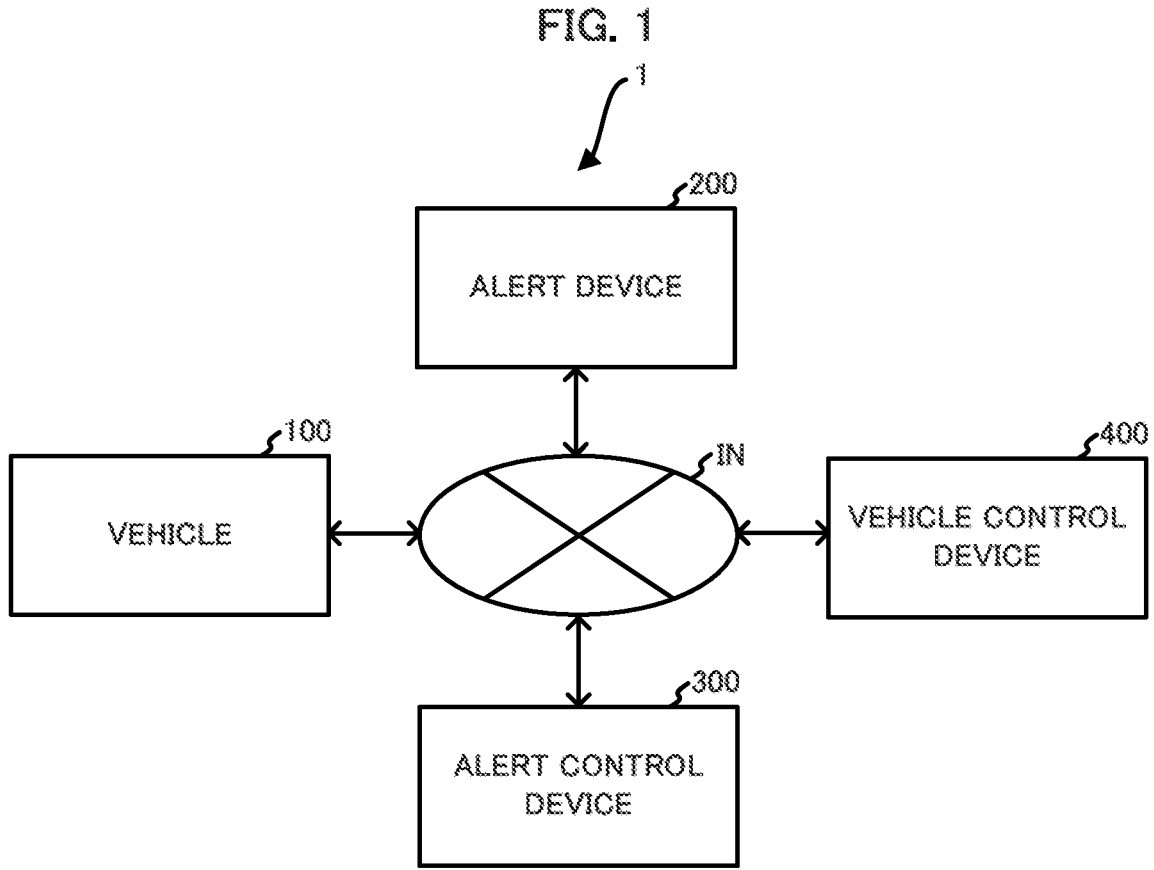
FIG. 1 is a system configuration diagram illustrating one configuration example of an alert system according to the present disclosure.

Hereinafter, an embodiment of the present disclosure is described with reference to the accompanying drawings. An alert system 1 according to the embodiment of the present disclosure includes, as illustrated in FIG. 1, a vehicle 100; an alert device 200 that executes an alert relating to the vehicle 100; an alert control device 300 that controls the alert device 200; and a vehicle control device 400 that controls the vehicle 100.

In the present embodiment, as an alert relating to the vehicle 100, an alert relating to departure (hereinafter referred to as "departure alert") of the vehicle 100 is taken as a concrete example and described, but the present embodiment is not limited to this. In addition, in the present embodiment, as the departure alert of the vehicle 100, an alert (hereinafter "leaving command alert") notifying a person staying at a port that the person is commanded to leave the port, is taken as a concrete example and described, but the present embodiment is not limited to this. The port is a place from which the departure of the vehicle 100 is scheduled.

The vehicle 100 is, for example, an unmanned aircraft such as a drone. In the present embodiment, the vehicle 100 delivers, for example, an article sold in a store set up on an electronic market, to a delivery destination designated by a purchaser of the article in a time range designated by the purchaser, but the present embodiment is not limited to this. In addition, in the present embodiment, the port is a parking area of (i) a warehouse in which an article to be delivered by the vehicle 100 is stored, or (ii) a store that sells such an article, but the port is not limited to this.

Figure 2:
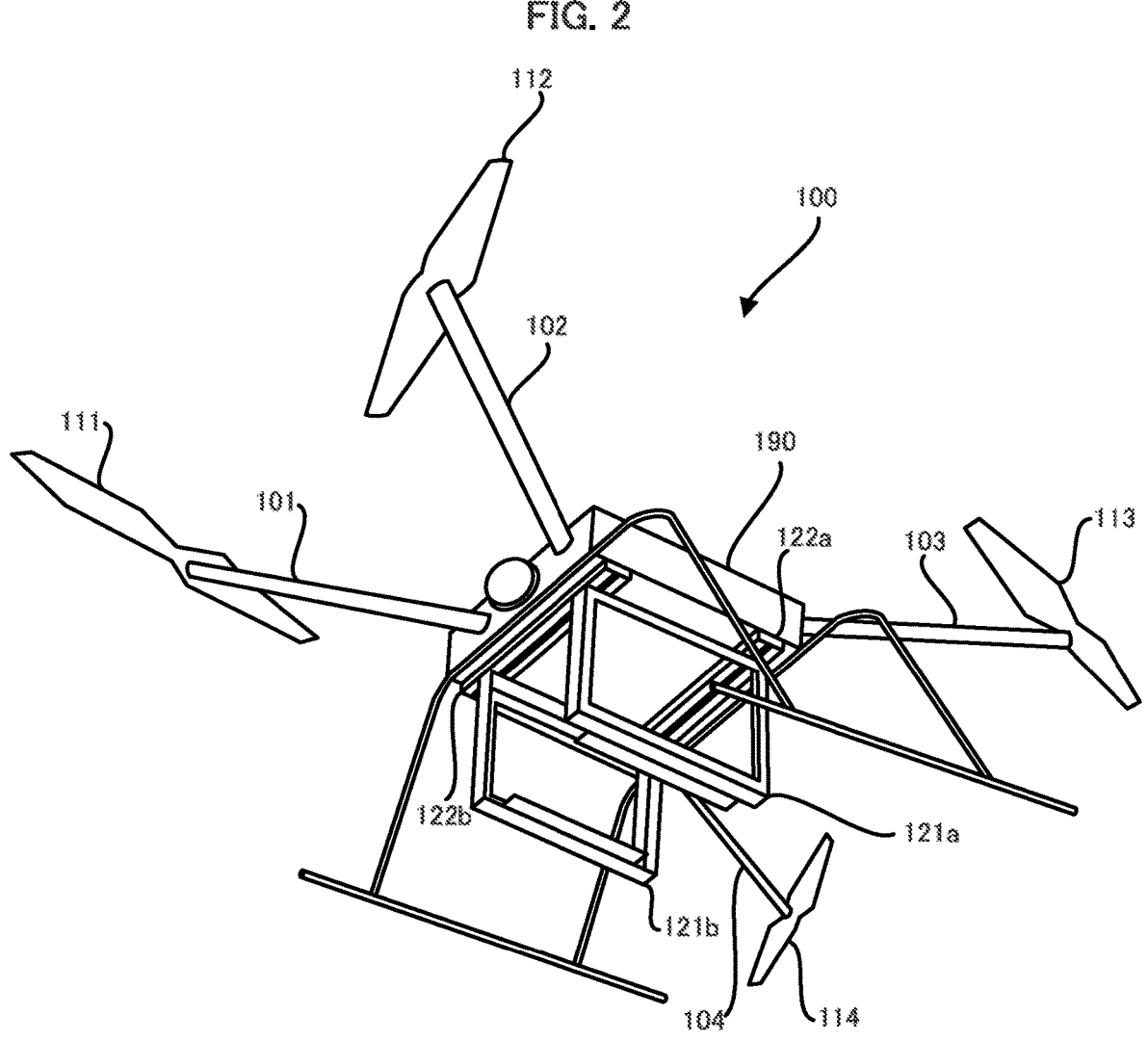
FIG. 2 is an external appearance configuration diagram illustrating one external appearance example of a vehicle according to an embodiment.

The vehicle 100 delivers an article by loading the article and flying to the delivery destination. Thus, the vehicle 100 includes a control device 190, as illustrated in FIG. 2, which controls the attitude and flying of the vehicle 100, propeller arms 101 to 104 projecting from the control device 190 toward the outside of the control device 190, propellers 111 to 114 disposed at distal ends of the propeller arms 101 to 104, and non-illustrated motors that rotate the propellers 111 to 114 in accordance with the control of the control device 190.

In addition, the vehicle 100 includes, on a lower surface of the control device 190, surrounding-and-holding frames 121a and 121b that surround and hold an article; guide rails 122a and 122b that suspend the surrounding-and-holding frames 121a and 121b, and that have the movement direction of the surrounding-and-holding frames 121a and 121b as the extending direction; and a non-illustrated motor that moves the surrounding-and-holding frames 121a and 121b in a direction toward each other or away from each other, in accordance with the control of the control device 190. In place of the surrounding-and-holding frames 121a and 121b, guide rails 122a and 122b and the motor, the vehicle 100 may include a non-illustrated storage cabinet that is used for loading an article, or a hook that suspends the article.

The vehicle 100 includes, for example, a non-illustrated data communication circuit that is a network interface card (NIC). The data communication circuit of the vehicle 100 executes data communication, with use of radio waves, for example, with a non-illustrated base station connected to a network IN including the internet, in accordance with communication standards including, for example, Long Term Evolution (LTE) and 5th Generation (5G).

After loading an article in the surrounding-and-holding frames 121a and 121b, the vehicle 100 takes off from the port, upon receiving a departure command from the vehicle control device 400 connected to the network IN. In this manner, the vehicle 100 departs from the port. In the present embodiment, the departure command is a command (a) including information representing a delivery route from the port to the delivery destination and (b) commanding (i) the departure from the port and (ii) the movement along the delivery route after the departure. Next, the vehicle 100 acquires information representing the delivery route from the departure command, and flies along the delivery route represented by the acquired information. Thereafter, upon arriving above the delivery destination, the vehicle 100 lands on the delivery destination, and releases the article from the surrounding-and-holding frames 121a and 121b by moving the surrounding-and-holding frames 121a and 121b in a direction away from each other. In this manner, the vehicle 100 completes the delivery of the article.

Figure 3:
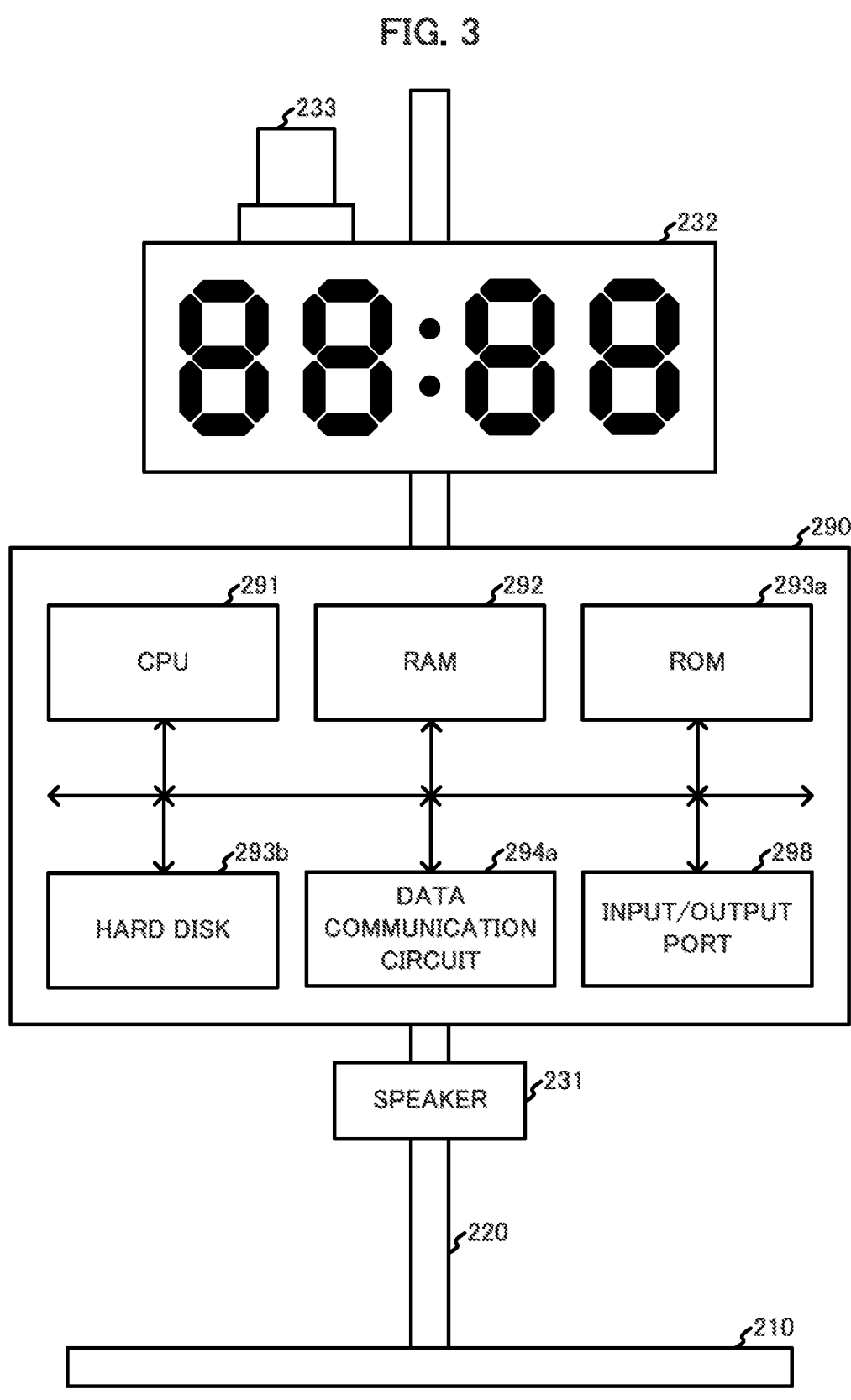
FIG. 3 is a hardware configuration diagram illustrating one configuration example of an alert device.

The alert device 200 is disposed at a position of the port, or at a position near the port. The position near the port means a position that is distant from the port by a distance that is equal to or less than a predetermined distance. The alert device 200 includes, as illustrated in FIG. 3, a base 210, a support column 220 vertically supported on the base 210, a speaker 231 supported by the support column 220, a 7-segment display 232, a rotating light 233 that is a so-called "patlamp", and a control device 290.

The speaker 231 of the alert device 200 executes a departure alert by outputting a predetermined audio, and the 7-segment display 232 executes a departure alert by displaying at least one of a predetermined character string, a predetermined character, or a predetermined symbol. The patlamp 233 executes a departure alert by executing at least one of lighting or flickering in accordance with a predetermined pattern. Thus, the speaker 231, 7-segment display 232 and patlamp 233 are generally referred to as "alertors 231 to 233".

The control device 290 of the alert device 200 includes a central processing unit (CPU) 291, a random access memory (RAM) 292, a read-only memory (ROM) 293a, a hard disk 293b that is a storage device, a data communication circuit 294a, and an input/output port 298. The control device 290 may include a plurality of CPUs, and may include a plurality of RAMs and flash memories.

The CPU 291 of the alert device 200 executes overall control of the alert device 200 by executing a program stored in the ROM 293a or the hard disk 293b. The RAM 292 temporarily stores data that is a processing target, at a time when the CPU 291 executes the program. The ROM 293a and hard disk 293b store various programs, various data used in the execution of the programs, and a table storing data. The structure and function of the data communication circuit 294a included in the alert device 200 are similar to the structure and function of a non-illustrated data communication circuit included in the vehicle 100. The input/output port 298 of the alert device 200 is connected to a non-illustrated cable that is connected to the alertors 231 to 233, and outputs signals, which are input by the CPU 291, to the alertors 231 to 233.

The CPU 291 of the alert device 200, when the alert device 200 is started up, acquires schedule information that (i) includes time information representing a time relating to the vehicle 100 (hereinafter referred to as "vehicle-related time"), and that (ii) represents a schedule relating to the vehicle 100, which is executed at the vehicle-related time. In the present embodiment, as a concrete example of the vehicle-related time, a time relating to a scheduled departure time (hereinafter "departure-related time") of the vehicle 100 from the port is taken, and the following description is given.

In addition, in the present embodiment, for the purpose of simple description, the following description is given by taking a departure schedule of the vehicle 100 from the port as a concrete example of the schedule relating to the vehicle 100, and taking, as a concrete example, a case where the departure-related time is the scheduled departure time itself. However, the departure-related time is not limited to the scheduled departure time, and may be a time that is earlier than the scheduled departure time by a predetermined time, or may be a time that is later than the scheduled departure time by a predetermined time.

Figure 5:
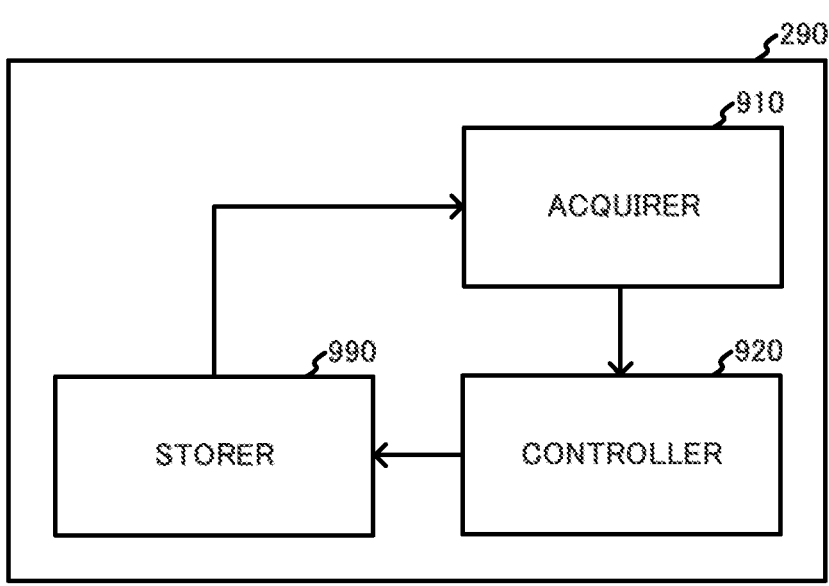
FIG. 5 is a functional block diagram illustrating an example of functions that the alert device includes.

Thus, the CPU 291 of the alert device 200, when the alert device 200 is started up, executes a departure information acquisition process as illustrated in FIG. 4, in order to acquire schedule information (hereinafter referred to as "departure schedule information") that (i) represents a departure schedule of the vehicle 100 from the port, and that (ii) includes time information representing the scheduled departure time of the vehicle 100 from the port. Thereby, the CPU 291 functions as an acquirer 910, as illustrated in FIG. 5, which acquires departure schedule information, and a controller 920 that controls the alertors 231 to 233, based on the departure schedule information, and the hard disk 293b functions as a storer 990 that stores the departure schedule information.

When the execution of the departure information acquisition process is started, the acquirer 910 of the alert device 200 tries acquisition of the departure schedule information from the data communication circuit 294a (step S01). At this time, when the departure schedule information is not acquired (step S02; No), the acquirer 910 executes the process of step S01 once again after a sleep over a predetermined time.

On the other hand, when the departure schedule information is acquired (step S02; Yes), the acquirer 910 of the alert device 200 acquires time information from the departure schedule information. In the present embodiment, the departure schedule information includes not only the time information representing the scheduled departure time, but also an article IDentification (ID) for identifying an article to be delivered by the vehicle 100 that departs from the port at the scheduled departure time. Thus, the acquirer 910 further acquires the article ID from the departure schedule information. Thereafter, the controller 920 saves the acquired article ID and time information in the storer 990, and the storer 990 stores the saved article ID and time information (steps S03 and S04).

Next, the acquirer 910 of the alert device 200 acquires, from the storer 990, information representing a length of a time (hereinafter referred to as "pre-departure-schedule alert time") during which a departure alert is executed before the scheduled departure time of the vehicle 100, and information representing a length of a time (hereinafter "post-departure-schedule alert time") during which a departure alert is executed after the scheduled departure time of the vehicle 100.

In the present embodiment, the length of the pre-departure-schedule alert time is preset to be a length equal to the sum of a length of a predetermined port leaving required time, and a length of a predetermined allowable time. The port leaving required time is predetermined as a time required from the start of leaving of a person from the port to the end of the leaving. However, the present embodiment is not limited to this, and the length of the pre-departure-schedule alert time may be set to be a length equal to the length of the port leaving required time. A person skilled in the art can determine a preferable length of the port leaving required time and a preferable length of the allowable time by experiments.

In the present embodiment, the reason why the length of the pre-departure-schedule alert time is preset to be the length equal to the sum of the length of the port leaving required time and the length of the predetermined allowable time is as follows. When the departure alert is started at a time earlier than the scheduled departure time of the vehicle 100 from the port by the pre-departure-schedule alert time, and when a person starts leaving from the port in accordance with the departure alert before the allowable time passes from the start of the departure alert, the person can finish the leaving from the port before the scheduled departure time of the vehicle 100. Thus, when the vehicle 100 departs from the port at or after the scheduled departure time, the physical contact between the vehicle 100 and the person can be prevented, and a decrease in safety can be suppressed.

In addition, in the present embodiment, the length of the post-departure-schedule alert time is preset to be a length equal to the length of the pre-departure-schedule alert time, or is preset to be a length longer than the length of the pre-departure-schedule alert time by a predetermined time. In the present embodiment, the reason why the length of the post-departure-schedule alert time is set in this manner is as follows. When the departure alert is ended at a time later than the departure time of the vehicle 100 from the port by the post-departure-schedule alert time, even when a person enters the port after the end of the departure alert and, for example, due to a fault, the vehicle 100 returns to the port, the leaving of the person from the port can be started at a time that is earlier than a time of arrival of the vehicle 100 to the port by the port leaving required time or more.

Next, the controller 920 of the alert device 200 sets, based on the scheduled departure time, (i) a timing of executing control to cause the alertors 231 to 233 to start the execution of the departure alert (hereinafter referred to as "departure alert start control"), and (ii) a timing of executing control to cause the alertors 231 to 233 to end the execution of the departure alert (hereinafter "departure alert end control"). In the present embodiment, the following description is given (i) by taking a timing of coming of a time that is earlier than the scheduled departure time by the pre-departure-schedule alert time as a concrete example of a timing at which the controller 920 of the alert device 200 executes the departure alert start control, and (ii) by taking a timing of coming of a time that is later than the scheduled departure time by the post-departure-schedule alert time as a concrete example of a timing at which the departure alert end control is executed.

Thus, the controller 920 of the alert device 200 sets, as a time of starting the departure alert (hereinafter referred to as "departure alert start time"), a time earlier than the scheduled departure time represented by the time information acquired in step S04 by the pre-departure-schedule alert time represented by the acquired information. In addition, the controller 920 sets, as a time of ending the departure alert (hereinafter "departure alert end time"), a time later than the scheduled departure time by the post-departure-schedule alert time.

Thereafter, the controller 920 of the alert device 200 saves, in the storer 990, the information representing the departure alert start time that is set, and the information representing the departure alert end time, and the storer 990 stores the saved information (steps S05 and S06). Then, the above-described process is repeated from step S01.

Figure 6:
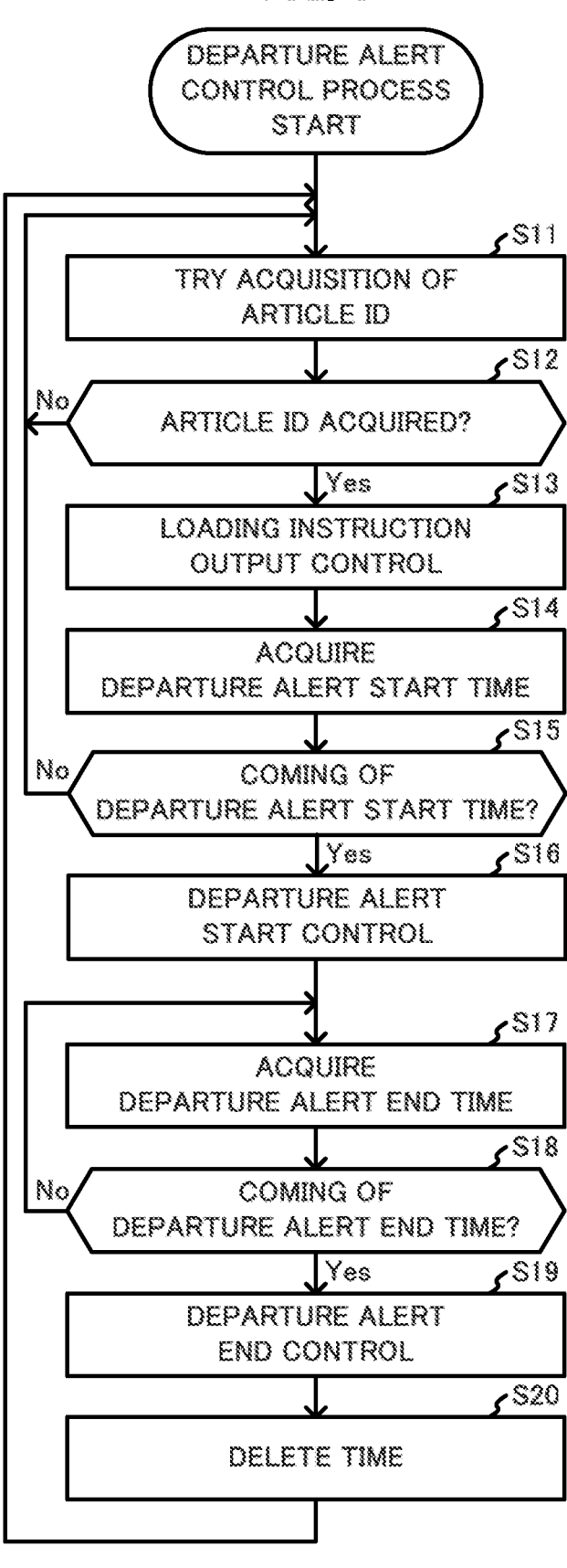
FIG. 6 is a flowchart illustrating an example of a departure alert control process that the alert device executes.

The CPU 291 of the alert device 200, when the alert device 200 is started up, executes a departure alert control process as illustrated in FIG. 6, which causes the alertors 231 to 233 to execute the departure alert, in parallel with the departure information acquisition process illustrated in FIG. 4. When the execution of the departure alert control process is started, the acquirer 910 tries to acquire from the storer 990 the article ID of an article that is to be delivered by the vehicle 100 (step S11). At this time, when the article ID is not acquired (step S12; No), the above-described process is repeated from step S11 after a sleep is executed over a predetermined time.

On the other hand, when the article ID is acquired (step S12; Yes), the controller 920 of the alert device 200 executes control (hereinafter referred to as "loading instruction output control") to cause the speaker 231 and 7-segment display 232 to output a loading instruction for loading an article identified by the article ID into the vehicle 100 (step S13). Thus, the acquirer 910 acquires, from the storer 990, audio data representing an audio reading aloud the article ID, and audio data representing an audio instructing the loading of the article in the vehicle 100, and the controller 920 outputs the acquired audio data to speaker 231. By outputting the audio, based on the input data, the speaker 231 issues a loading instruction to a worker staying at a position of the alert device 200 or at a position near the alert device 200. The position near the alert device 200 means a position that is distant from the position of the alert device 200 by a distance that is equal to or less than a predetermined distance.

In addition, the controller 920 of the alert device 200 outputs the article ID to the 7-segment display 232, and the 7-segment display 232 displays the article ID, thereby issuing a loading instruction to a worker staying at a position of the alert device 200 or at a position near the alert device 200. The worker, who confirmed the audio of the speaker 231 or the display on the 7-segment display 232, searches, for example, the shelves of the warehouse or the store, for an article to be delivered by the vehicle 100, based on the article ID, and loads the searched article in the surrounding-and-holding frames 121*a* and 121*b* of the vehicle 100.

Next, the acquirer 910 of the alert device 200 acquires the information representing the departure alert start time from the storer 990 (step S14). Thereafter, the acquirer 910 acquires information representing a system time, for example, from an operating system (OS) of the alert device 200. Next, based on the acquired information, the controller 920 determines whether or not the departure alert start time has come. At this time, when the controller 920 determines that the departure alert start time has not come (step S15; No) since the system time represented by the acquired information is a time earlier than the departure alert start time, the above-described process is repeated from step S11.

On the other hand, when the controller 920 of the alert device 200 determines that the departure alert start time has come (step S15; Yes) since the system time is at or after the departure alert start time, the controller 920 executes the departure alert start control for the alertors 231 to 233 (step S16). For this purpose, the controller 920 outputs a signal commanding the start of the departure alert (hereinafter referred to as "departure alert start signal") to the input/output port 298, with the alertors 231 to 233 being set as destinations. When the departure alert start signal is input to the alertors 231 to 233 from the input/output ports 298, the alertors 231 to 233 start the execution of the departure alert, and continues the execution of the departure alert until a signal commanding the end of the departure alert (hereinafter "departure alert end signal") is input.

Next, the acquirer 910 of the alert device 200 acquires the information representing the departure alert end time from the storer 990 (step S17). Thereafter, by executing a process similar to the process of step S15, the controller 920 determines whether or not the departure alert end time has come. At this time, when the controller 920 determines that the departure alert end time has not come (step S18; No), a sleep is executed over a predetermined time, and then the above-described process is repeated from step S17.

On the other hand, when the controller 920 of the alert device 200 determines that the departure alert end time has come (step S18; Yes), the controller 920 of the alert device 200 executes the departure alert end control for the alertors 231 to 233 (step S19). For this purpose, the controller 920 executes a process similar to the process of step S16, thereby outputting the departure alert end signal to the alertors 231 to 233, and, when the departure alert end signal is input to the alertors 231 to 233, the alertors 231 to 233 terminates the execution of the depart alert. Next, the controller 920 deletes the article ID, the time information representing the scheduled departure time, the information representing the departure alert start time, and the information representing the departure alert end time, which are stored in the storer 990 (step S20). Thereafter, the above-described process is repeated from step S11.

Figure 7:
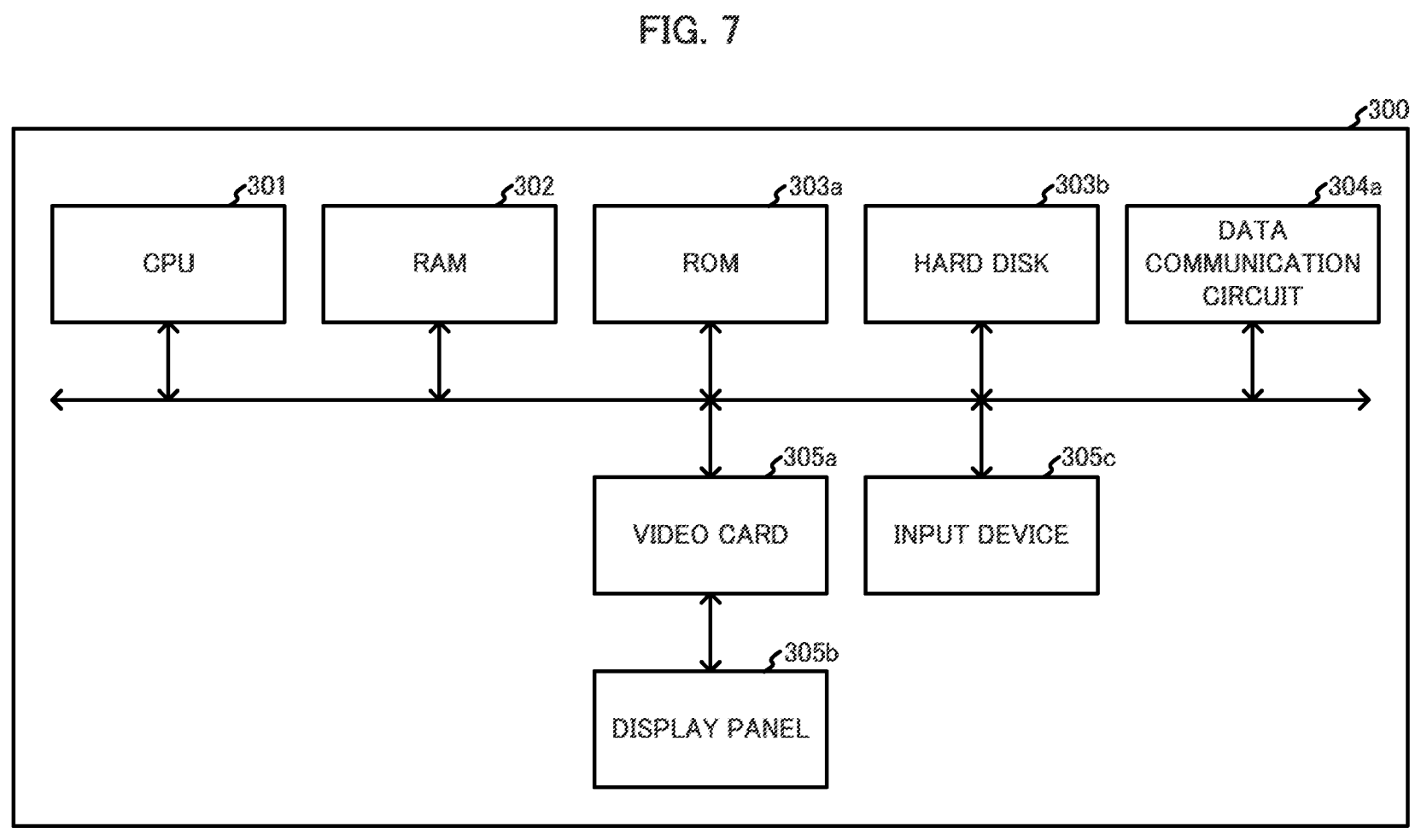

The alert control device 300 is, for example, a server, and, for example, (i) provides an electronic market, and (ii) is disposed in an office building of a company that intermediates for buying and selling of articles between a seller that sells an article and a customer that purchases the article. The alert control device 300 includes, as hardware, a CPU 301, a RAM 302, a ROM 303*a*, a hard disk 303*b*, a data communication circuit 304*a*, a video card 305*a*, a display panel 305*b*, and an input device 305*c*, as illustrated in FIG. 7. The alert control device 300 may include a plurality of CPUs, and may include a plurality of RAMs and flash memories.

The structures and functions of the CPU 301, RAM 302, ROM 303*a*, hard disk 303*b* and data communication circuit 304*a*, which the alert control device 300 includes, are similar to the structures and functions of the CPU 291, RAM 292, ROM 293*a*, hard disk 293*b* and data communication circuit 294*a*, which the alert device 200 includes. The video card 305*a* of the alert control device 300 outputs an image signal, based on a digital signal that is output from the CPU 301. The display panel 305*b* is an electroluminescence (EL) display, a plasma display panel (PDP), or a liquid crystal display (LCD), and displays an image in accordance with the image signal that is output from the video card 305*a*. The input device 305*c* is at least one of a keyboard, a mouse, a touch pad, or a button, and outputs a signal corresponding to an operation of a worker who works in the office building.

When the data communication circuit 304*a* of the alert control device 300 receives, for example, a delivery request from a non-illustrated server that provides an electronic market, the CPU 301 of the alert control device 300 executes a non-illustrated departure schedule generation process that generates a departure schedule of the vehicle 100, based on the delivery request. Upon starting the execution of the departure schedule generation process, the CPU 301 acquires the delivery request from the data communication circuit 304*a*. The delivery request is a request that (a) includes (i) an article ID of a sold article, (ii) information representing the position of a delivery destination designated by a purchaser of the article, and (iii) information representing a delivery time range designated by the purchaser as a time range in which the article is delivered, and (b) requests that the article be delivered to the delivery destination in the time range.

Next, the CPU 301 of the alert control device 300 acquires, from the delivery request, the article ID, the information representing the position of the delivery destination, and the information representing the delivery time range. Thereafter, the CPU 301 acquires, from the hard disk 303*b*, information representing the position of the port on which the vehicle 100 lands, and a partial route table storing information representing a partial route, along which the vehicle 100 is movable. In the present embodiment, the partial route, along which the vehicle 100 is movable, includes a route passing over, for example, (i) a road, (ii) a river, (iii) a riverside, or (iv) a park, but the partial route is not limited to this. Thereafter, the CPU 301 determines a delivery route reaching the position of the delivery destination from the position of the port, based on the information representing the position of the port, the information representing the position of the delivery destination, and the information stored in the partial route table. In the present embodiment, as an algorithm for determining the delivery route, for example, Dijkstra's algorithm is used, but a publicly known route search algorithm, other than Dijkstra's algorithm, may be used.

Next, the CPU 301 of the alert control device 300 acquires information representing a predetermined movement velocity of the vehicle 100 from the hard disk 303*b*, and calculates a movement time that is required for the vehicle 100 to move from the port to the position of the delivery destination, based on the movement velocity represented by the acquired information, and the determined delivery route. For this purpose, the CPU 301 calculates a distance of the delivery route, for example, based on the information representing the delivery route, and calculates the movement time by dividing the calculated distance by the movement velocity of the vehicle 100. In the present embodiment, the movement velocity of the vehicle 100 is an average movement velocity of the vehicle 100 measured in the past, but the movement velocity is not limited to this, and the movement velocity may be a maximum velocity that the vehicle 100 can achieve, or a maximum velocity designated by law.

Thereafter, the CPU 301 of the alert control device 300 determines a delivery time included in the delivery time range, at random, or based on a predetermined rule. Next, the CPU 301 determines a time earlier than the determined delivery time by the calculated movement time, as the scheduled departure time of the vehicle 100. Then, the CPU 301 generates departure schedule information that (a) includes (i) an article ID of an article to be delivered by the vehicle 100 and (ii) time information representing the determined scheduled departure time, and that (b) represents a schedule of departure of the vehicle 100 from the port at the scheduled departure time. Thereafter, the CPU 301 saves in the hard disk 303*b* the generated departure schedule information and the information representing the determined delivery route. Then, the CPU 301 terminates the execution of the departure schedule generation process.

The CPU 301 of the alert control device 300, when the alert control device 300 is started up, executes a departure information output process, as illustrated in FIG. 8, of outputting the departure schedule information saved in the hard disk 303*b* to the data communication circuit 304*a*, with the alert device 200 being set as a destination. When the execution of the departure information output process is started, the CPU 301 tries acquisition of the departure schedule information from the hard disk 303*b* (step S21). When the departure schedule information is not acquired at this time (step S22; No), the process of step S21 is executed once again after a sleep is executed over a predetermined time.

On the other hand, when the departure schedule information is acquired (step S22; Yes), the CPU 301 of the alert control device 300 outputs the acquired departure schedule information to the data communication circuit 304*a*, with the alert device 200 being set as a destination (step S23). Thereafter, the data communication circuit 304*a* of the alert control device 300 transmits the output departure schedule information to the alert device 200. Upon receiving the departure schedule information, the alert device 200 starts the execution of the departure alert at a timing based on the time information included in the departure schedule information.

Next, the CPU 301 of the alert control device 300 acquires the time information from the departure schedule information. Then, by executing a process similar to the process of step S15 of FIG. 6, the CPU 301 determines whether or not the scheduled departure time represented by the acquired time information has come. At this time, when the CPU 301 determines that the scheduled departure time has not come (step S24; No), the above-described process is repeated from step S21.

On the other hand, when the CPU 301 of the alert control device 300 determines that the scheduled departure time has come (step S24; Yes), the CPU 301 acquires the information representing the delivery route from the hard disk 303*b*. Next, the CPU 301 acquires a vehicle ID identifying the vehicle 100 from the hard disk 303*b*. Thereafter, the CPU 301 generates a departure command that includes the vehicle ID of the vehicle 100 and the information representing the delivery route, and that commands the vehicle 100 to depart from the port and to move along the delivery route after the departure. Then, the CPU 301 outputs the generated departure command to the data communication circuit 304*a*, with the vehicle control device 400 being set as a destination (step S25).

Thereafter, the data communication circuit 304*a* of the alert control device 300 transmits the departure command to the vehicle control device 400, and the vehicle control device 400 transfers the departure command to the vehicle 100, based on the vehicle ID included in the departure command. In the present embodiment, the vehicle ID of the vehicle 100 is a communication address allocated to the vehicle 100, but the vehicle ID is not limited to this, and may be an identification number of the vehicle 100.

Next, the CPU 301 of the alert control device 300 deletes the departure schedule information and the information representing the delivery route from the hard disk 303*b* (step S26), and thereafter repeats the above-described process from step S21.

The vehicle control device 400 is, for example, a server, and is disposed, for example, in an office building of a company that manufactures and sells the vehicle 100. The vehicle control device 400 includes, as hardware, a CPU, a RAM, a ROM, a hard disk, a data communication circuit, a video card, a display panel, and an input device, which are not illustrated. The structures and functions of the hardware included in the vehicle control device 400 are similar to the structures and functions of the hardware included in the alert control device 300.

According to these configurations, the alert device 200 includes the data communication circuit 294*a* that receives from the alert control device 300 the time information representing the vehicle-related time that is a time relating to the vehicle 100, and the storer 990 that stores the received time information. In addition, the alert device 200 includes the alertors 231 to 233 that execute the departure alert that is an alert relating to the vehicle 100, based on the vehicle-related time represented by the stored time information. Thus, when the alert device 200 only receives the time information from the alert control device 300, the alert device 200 can execute the departure alert, based on the vehicle-related time represented by the time information. In other words, even when the quality of communication with the alert control device 300 is lowered after the alert device 200 receives the time information, a decrease in accuracy of the departure alert relating to the vehicle 100 can be suppressed after the quality of communication is lowered.

In the present embodiment, that the quality of communication is lowered means that communication is interrupted, but the embodiment is not limited to this. That the quality of communication is lowered may mean that communication delays, or that a loss of communication packets increases. Besides, that the quality of communication is lowered may mean at least one of the interruption of communication, the delay in communication, or the increase in the loss of communication packets.

Additionally, in the present embodiment, the accuracy of the departure alert includes both the accuracy of the alert before the departure and the accuracy of the alert after the departure. However, the embodiment is not limited to this, and the accuracy of the departure alert may include only one of the accuracy of the alert before the departure and the accuracy of the alert after the departure.

Additionally, in the present embodiment, the accuracy of the alert before the departure is expressed by a ratio (hereinafter referred to as "departure alert appropriate start ratio") of the number of times by which the start timing of the departure alert is appropriate (hereinafter "departure alert appropriate start number") to the number of times by which the vehicle 100 departs from the port (hereinafter "departure number"), but the present embodiment is not limited to this. The departure alert appropriate start number is the number of times by which the execution of the departure alert is started at or before a time that is earlier, by the port leaving required time, than the departure time at which the vehicle 100 departs from the port. However, the present embodiment is not limited to this, and the departure alert appropriate start number may be the number of times by which the execution of the departure alert is started during a period of a predetermined length, the end time of which is a time that is earlier than the departure time by the port leaving required time. That the execution of the departure alert is started during this period means that the execution of the departure alert is started at or after the start time of this period and at or before the end time of this period. In addition, a person skilled in the art can determine a preferable length of this period by experiments. The reason why the departure alert appropriate start number is defined like above is that in a case where the departure alert is started at or before the time earlier than the departure time by the port leaving required time, when a person staying at the port starts leaving the port at a timing of the start of the departure alert, the person can complete the leaving from the port before the departure time of the vehicle 100.

Additionally, in the present embodiment, the accuracy of the alert after the departure is expressed by a ratio (hereinafter referred to as "departure alert appropriate end ratio") of the number of times by which the end timing of the departure alert is appropriate (hereinafter "departure alert appropriate end number") to the departure number of the vehicle 100, but the present embodiment is not limited to this. The departure alert appropriate end number is the number of times by which the execution of the departure alert is ended at or after a time that is later, by the port leaving required time, than the departure time at which the vehicle 100 departs from the port by the port. However, the present embodiment is not limited to this, and the departure alert appropriate end number may be the number of times by which the execution of the departure alert is ended during a period of a predetermined length, the start time of which is a time that is later than the departure time by the port leaving required time. That the execution of the departure alert is ended during this period means that the execution of the departure alert is ended at or after the start time of this period and at or before the end time of this period. In addition, a person skilled in the art can determine a preferable length of this period by experiments. The reason why the departure alert appropriate end number is defined like above is that in a case where the departure alert is ended at or after the time later than the departure time by the port leaving required time, even when, for example, the vehicle 100 returns due to a fault, for example, to the port into which a person came after the end of the departure alert, the leaving of the person from the port can be started at or before the time that is earlier, by the port leaving required time, than the time at which the vehicle 100 arrives at the port.

In the present embodiment, the description was given that the accuracy of the departure alert includes both the accuracy of the alert before the departure and the accuracy of the alert after the departure, the accuracy of the alert before the departure is expressed by the departure alert appropriate start ratio, and the accuracy of the alert after the departure is expressed by the departure alert appropriate end ratio. Thus, in the present embodiment, the accuracy of the departure alert is expressed by a sum of a value obtained by weighting the departure alert appropriate start ratio with a positive weighting factor ab and a value obtained by weighting the departure alert appropriate end ratio with a positive weighting factor aa. A person skilled in the art can determine preferable positive weighting factors ab and aa by experiments. However, the present embodiment is not limited to this, and the calculation method of the accuracy of the departure alert may be any calculation method in which the accuracy of the departure alert with a higher value is calculated as the departure alert appropriate start ratio becomes higher, and the accuracy of the departure alert with a higher value is calculated as the departure alert appropriate end ratio becomes higher.

According to these configurations, the alert relating to the vehicle 100 includes the departure alert relating to the departure of the vehicle 100, and the vehicle-related time that is the time relating to the vehicle 100 includes the departure-related time that is the time relating to the scheduled departure time of the vehicle 100. Furthermore, the data communication circuit 294a of the alert device 200 receives the time information representing the departure-related time from the alert control device 300, and the storer 990 of the alert device 200 stores the received time information. Besides, the controller 920 of the alert device 200 execute departure alert start control at a timing based on the departure-related time that is (i) the time represented by the stored time information and (ii) the scheduled departure time of the vehicle 100. The departure alert start control is control of causing the alertors 231 to 233 to start execution of the departure alert. Thus, when the vehicle 100 receives the departure command at the scheduled departure time and departs from the port, the alert device 200 can start the execution of the departure alert at an appropriate timing based on the scheduled departure time, and therefore a decrease in accuracy of the departure alert can be suppressed.

Modification 1 of the Embodiment

In the embodiment, as the alert relating to the vehicle 100, the case where the alert device 200 executes the departure alert relating to the departure of the vehicle 100 was described as a concrete example. On the other hand, in the present modification, as the alert relating to the vehicle 100, a case where the alert device 200 executes an alert relating to arrival of the vehicle 100 (hereinafter referred to as "arrival alert") is described as a concrete example.

In addition, in the embodiment, the port was described as being a place where the departure of the vehicle 100 is scheduled. In the present modification, the port is a place where the arrival of the vehicle 100 is scheduled. Thus, in the present modification, as a concrete example, a case is described in which a leaving command alert is executed as the arrival alert of the vehicle 100, the leaving command alert notifying a person staying at the port that the person is commanded to leave the port, but the present modification is not limited to this. The port is the place where the arrival of the vehicle 100 is scheduled.

In the present modification, the vehicle 100, which finished the delivery of an article, receives a departure command that (a) includes information representing a return route to the port from the delivery destination of the article, and (b) commands (i) the departure from the delivery destination and (ii) the movement along the return route after the departure. Subsequently, in accordance with the departure command, the vehicle 100 departs from the delivery destination and flies to the port. Then, after the vehicle 100 arrives above the port, the vehicle 100 lands on the port. In this manner, the vehicle 100 arrives at the port.

The alertors 231 to 233 of the alert device 200 according to the present modification executes the arrival alert. Thus, the speaker 231 that is the alertor 231 outputs a predetermined audio, the 7-segment display 232 that is the alertor 232 displays at least one of a predetermined character string, a predetermined character, or a predetermined symbol, and the patlamp 233 that is the alertor 233 executes at least one of lighting or flickering in accordance with a predetermined pattern.

The alert device 200, when the alert device 200 is started up, acquires schedule information that (i) includes time information representing a vehicle-related time, and that (ii) represents a schedule relating to the vehicle 100, which is executed at the vehicle-related time. In the present modification, as a concrete example of the vehicle-related time, a time relating to a scheduled arrival time (hereinafter "arrival-related time") of the vehicle 100 at the port is taken, and the following description is given.

In addition, in the present modification, for the purpose of simple description, the following description is given by taking an arrival schedule of the vehicle 100 to the port as a concrete example of the schedule relating to the vehicle 100, and taking, as a concrete example, a case where the arrival-related time is the scheduled arrival time itself. However, the arrival-related time is not limited to the scheduled arrival time, and may be a time that is earlier than the scheduled arrival time by a predetermined time, or may be a time that is later than the scheduled arrival time by a predetermined time.

Thus, the alert device 200, when the alert device 200 is started up, executes a non-illustrated arrival information acquisition process of acquiring schedule information (hereinafter referred to as "arrival schedule information") that (i) represents an arrival schedule of the vehicle 100 at the port, and that (ii) includes time information representing the scheduled arrival time of the vehicle 100 at the port.

When the alert device 200 starts the execution of the arrival information acquisition process, the alert device 200 tries acquisition of the arrival schedule information from the data communication circuit 294a by executing a process similar to the process of steps S01 and S02 of FIG. 4. At this time, when the arrival schedule information is not acquired, the above-described process is repeated from the process similar to the process of step S01 after a sleep is executed over a predetermined time.

On the other hand, when the arrival schedule information is acquired, the alert device 200 executes a process similar to the process of steps S04 to S06 of FIG. 4. Thereby, the alert device 200 acquires time information representing the scheduled arrival time from the arrival schedule information. In addition, the alert device 200 acquires, from the storer 990, information representing a length of a time (hereinafter referred to as "pre-arrival-schedule alert time") during which an arrival alert is executed before the scheduled arrival time of the vehicle 100, and information representing a length of a time (hereinafter "post-arrival-schedule alert time") during which an arrival alert is executed after the scheduled arrival time of the vehicle 100.

In the present modification, the length of the pre-arrival-schedule alert time is preset to be a length equal to the sum of a length of a port leaving required time, a length of an allowable time, and a length of a prediction difference time.

The prediction difference time is (i) a difference between a scheduled arrival time of the vehicle 100 at the port and an arrival time of actual arrival of the vehicle 100 at the port, and (ii) a time predicted to occur at a probability that is equal to or higher than a predetermined probability. A person skilled in the art can determine a preferable length of the prediction difference time by experiments.

In the present modification, the reason why the length of the pre-arrival-schedule alert time is set in this manner is as follows. When the arrival alert is started at a time earlier than the scheduled arrival time of the vehicle 100 at the port by the pre-arrival-schedule alert time, and when a person starts leaving from the port in accordance with the arrival alert before the passage of the allowable time from the start of the arrival alert, the person can finish the leaving from the port before the arrival of the vehicle 100 at the port, even when the arrival of the vehicle 100 at the port becomes earlier than the scheduled arrival time by the prediction difference time. Thus, since the physical contact between the vehicle 100 and the person can be prevented, a decrease in safety can be suppressed.

In addition, in the present modification, the length of the post-arrival-schedule alert time is preset to be a length equal to the length of the prediction difference time. In the present modification, the reason why the length of the post-arrival-schedule alert time is set in this manner is as follows. When the arrival alert is continued until a time that is later than the scheduled arrival time of the vehicle 100 at the port by the post-arrival-schedule alert time, even in a case where the arrival of the vehicle 100 at the port becomes later than the scheduled arrival time by the prediction difference time, the arrival alert can be continued until the arrival of the vehicle 100 at the port.

Thereafter, the alert device 200 sets a time of starting the arrival alert (hereinafter referred to as "arrival alert start time"), based on the length of the pre-arrival-schedule alert time and the scheduled arrival time represented by the time information. For this purpose, the alert device 200 sets, as the arrival alert start time, a time earlier than the scheduled arrival time by the pre-arrival-schedule alert time. In addition, the alert device 200 sets a time of ending the arrival alert (hereinafter "arrival alert end time"), based on the length of the post-arrival-schedule alert time and the scheduled arrival time. For this purpose, the alert device 200 sets, as the arrival alert end time, a time later than the scheduled arrival time by the post-arrival-schedule alert time. Next, the alert device 200 saves, in the storer 990, the time information representing the scheduled arrival time, the information representing the arrival alert start time, and the information representing the arrival alert end time, and then repeats the above-described process from the process similar to the process of step S01.

In addition, the alert device 200 according to the present modification, when the alert device 200 is started up, executes a non-illustrated arrival alert control process that causes the alertors 231 to 233 to execute the arrival alert, in parallel with the non-illustrated arrival information acquisition process that was already described. When the execution of the arrival alert control process is started, the alert device 200 tries to acquire from the storer 990 the information representing the arrival alert start time, by executing a process similar to the process of step S11 of FIG. 6. At this time, when the information representing the arrival alert start time is not acquired, the above-described process is repeated from the process similar to the process of step S11 after a sleep is executed over a predetermined time.

When the information representing the arrival alert start time is acquired, the alert device 200 executes a process similar to the process of steps S14 to S16. Thereby, when the arrival alert start time has come, the controller 920 of the alert device 200 executes control to cause the alertors 231 to 233 to start the execution of the arrival alert (hereinafter referred to as "arrival alert start control"). Thereafter, the alert device 200 executes a process similar to the process of steps S17 to S19. Thereby, the acquirer 910 of the alert device 200 acquires the information representing the arrival alert end time from the storer 990, and, when the arrival alert end time has come, the controller 920 executes control to cause the alertors 231 to 233 to end the execution of the arrival alert (hereinafter referred to as "arrival alert end control"). Next, by executing a process similar to the process of step S20, the alert device 200 deletes the time information representing the scheduled arrival time, the information representing the arrival alert start time, and the information representing the arrival alert end time, these pieces of information being stored in the storer 990. Thereafter, the alert device 200 repeats the above-described process from the process similar to the process of step S11.

Upon arriving at the delivery destination and completing the delivery of the article, the vehicle 100 according to the present modification transmits to the alert control device 300 a delivery completion report that (i) includes information representing the position of the delivery destination, and that (ii) reports the completion of delivery of the article to the delivery destination. When the data communication circuit 304a of the alert control device 300 receives the delivery completion report, the CPU 301 of the alert control device 300 acquires information representing the position of the delivery destination from the delivery completion report. Next, the CPU 301 acquires, from the hard disk 303b, information representing the position of the port, and a partial route table storing information representing a partial route along which the vehicle 100 is movable. Thereafter, the alert control device 300 determines a return route reaching the position of the port from the position of the delivery destination, based on the information representing the position of the port, the information representing the position of the delivery destination, and the information stored in the partial route table.

Next, the alert control device 300 acquires the vehicle ID of the vehicle 100 from the hard disk 303b, and generates a departure command that (a) includes (i) the vehicle ID of the vehicle 100 and (ii) the information representing the return route, and that (b) commands the vehicle 100 to (i) depart from the delivery destination and to (ii) move along the return route after the departure. Then, the alert control device 300 transmits the generated departure command to the vehicle control device 400, and the vehicle control device 400 transfers the departure command to the vehicle 100.

Next, the CPU 301 of the alert control device 300 acquires, for example, from the OS, information representing the system time, as information representing a transmission time of the departure command. Then, the CPU 301 acquires information representing a movement velocity of the vehicle 100 from the hard disk 303b, and calculates a movement time that is required for the vehicle 100 to move from the position of the delivery destination to the position of the port, based on the acquired movement velocity and the determined return route. Next, the CPU 301 determines, as the scheduled arrival time of the vehicle 100 at the port, the time later than the transmission time of the departure command by the calculated movement time.

Then, the CPU 301 of the alert control device 300 generates arrival schedule information including time information representing the determined scheduled arrival time, and transmits the generated arrival schedule information to the data communication circuit 304a of the alert control device 300, with the alert device 200 being set as a destination. Thereafter, the data communication circuit 304a of the alert control device 300 transmits the arrival schedule information to the alert device 200, and, upon receiving the arrival schedule information, the alert device 200 starts the execution of the arrival alert at a timing based on the time information included in the arrival schedule information.

According to these configurations, the alertors 231 to 233 of the alert device 200 executes the arrival alert relating to the arrival of the vehicle 100, based on the vehicle-related time represented by the time information that is stored. Thus, when the alert device 200 only receives the time information from the alert control device 300, the alert device 200 can execute the arrival alert, based on the vehicle-related time represented by the time information, and therefore a decrease in accuracy of the arrival alert can be suppressed.

In the present modification, the accuracy of the arrival alert includes both the accuracy of the alert before the arrival and the accuracy of the alert after the arrival. However, the accuracy of the arrival alert is not limited to this, and the accuracy of the arrival alert may include only one of the accuracy of the alert before the arrival and the accuracy of the alert after the arrival.

In the present modification, the accuracy of the alert before the arrival is expressed by a ratio (hereinafter referred to as "arrival alert appropriate start ratio") of the number of times by which the start timing of the arrival alert is appropriate (hereinafter "arrival alert appropriate start number") to the number of times by which the vehicle 100 arrives at the port (hereinafter "arrival number"), but the present modification is not limited to this. The arrival alert appropriate start number is the number of times by which the execution of the arrival alert is started at or before a time that is earlier, by the port leaving required time, than the arrival time at which the vehicle 100 arrives at the port. However, the present modification is not limited to this, and the arrival alert appropriate start number may be the number of times by which the execution of the arrival alert is started during a period of a predetermined length, the end time of which is a time that is earlier than the arrival time by the port leaving required time. That the execution of the arrival alert is started during this period means that the execution of the arrival alert is started at or after the start time of this period and at or before the end time of this period. In addition, a person skilled in the art can determine a preferable length of this period by experiments.

Additionally, in the present modification, the accuracy of the alert after the arrival is expressed by a ratio (hereinafter referred to as "arrival alert appropriate end ratio") of the number of times by which the end timing of the arrival alert is appropriate (hereinafter "arrival alert appropriate end number") to the arrival number of the vehicle 100, but the present modification is not limited to this. The arrival alert appropriate end number is the number of times by which the execution of the arrival alert is ended at or after the arrival time at which the vehicle 100 arrives at the port. However, the present modification is not limited to this, and the arrival alert appropriate end number may be the number of times by which the execution of the arrival alert is ended during a period of a predetermined length, the start time of which is the arrival time. That the execution of the arrival alert is ended during this period means that the execution of the arrival alert is ended at or after the start time of this period and at or before the end time of this period. In addition, a person skilled in the art can determine a preferable length of this period by experiments.

In the present modification, the accuracy of the arrival alert includes both the accuracy of the alert before the arrival and the accuracy of the alert after the arrival, the accuracy of the alert before the arrival is expressed by the arrival alert appropriate start ratio, and the accuracy of the alert after the arrival is expressed by the arrival alert appropriate end ratio. Thus, in the present modification, the accuracy of the arrival alert is expressed by the sum of a value obtained by weighting the arrival alert appropriate start ratio with a positive weighting factor $3b$ and a value obtained by weighting the arrival alert appropriate end ratio with a positive weighting factor Pa. A person skilled in the art can determine preferable positive weighting factors Pa and pb by experiments. However, the present modification is not limited to this, and the calculation method of the accuracy of the arrival alert may be any calculation method in which the accuracy of the arrival alert with a higher value is calculated as the arrival alert appropriate start ratio becomes higher, and the accuracy of the arrival alert with a higher value is calculated as the arrival alert appropriate end ratio becomes higher.

Modification 2 of the Embodiment

The embodiment, in which the alert device 200 executes the departure alert relating to the departure of the vehicle 100, and Modification 1, in which the alert device 200 executes the arrival alert relating to the arrival of the vehicle 100, can be combined. In other words, the alert device 200 may execute both the departure alert and the arrival alert.

Modification 3 of the Embodiment

In the embodiment, the case where the departure-related time represented by the time information is the scheduled departure time was described as a concrete example, but the embodiment is not limited to this. In the present modification, a case where the departure-related time is a time earlier than the scheduled departure time by the pre-departure-schedule alert time is described as a concrete example.

Thus, upon determining the scheduled departure time, the CPU 301 of the alert control device 300 according to the present modification acquires information representing the pre-departure-schedule alert time from the hard disk 303*b*, and determines the departure-related time, based on the pre-departure-schedule alert time represented by the acquired information and the determined scheduled departure time. Next, the CPU 301 of the alert control device 300 generates departure schedule information including an article ID of an article to be delivered by the vehicle 100, and time information representing the determined departure-related time. Thereafter, the alert control device 300 transmits the generated departure schedule information to the alert device 200.

The alert device 200 according to the present modification receives the departure schedule information, and, in step S04 of FIG. 4, acquires the time information from the departure schedule information. Thereafter, in step S05, the alert device 200 sets, as the departure alert start time, the departure-related time that is (i) the time represented by the time information and is (ii) the time earlier than the scheduled departure time by the pre-departure-schedule alert time. Next, in step S06, the alert device 200 calculates a time later than the departure-related time by the total time of the pre-departure-schedule alert time and the post-departure-schedule alert time, thereby calculating a time later than the scheduled departure time by the post-departure-schedule alert time. Thereafter, the alert device 200 sets the calculated time as the departure alert end time.

Modification 4 of the Embodiment

In Modification 1 of the embodiment, the case where the arrival-related time represented by the time information is the scheduled arrival time was described as a concrete example, but Modification 1 is not limited to this. In the present modification, a case where the arrival-related time is a time earlier than the scheduled arrival time by the pre-arrival-schedule alert time is described as a concrete example.

Thus, upon determining the scheduled arrival time, the CPU 301 of the alert control device 300 according to the present modification acquires information representing the pre-arrival-schedule alert time from the hard disk 303*b*, and determines the arrival-related time, based on the pre-arrival-schedule alert time represented by the acquired information and the determined scheduled arrival time. Next, the alert control device 300 transmits arrival schedule information including time information representing the determined arrival-related time to the alert device 200.

The alert device 200 according to the present modification receives the arrival schedule information, and acquires the time information from the arrival schedule information. Thereafter, the alert device 200 sets, as the arrival alert start time, the arrival-related time that is (i) the time represented by the time information and is (ii) the time earlier than the scheduled arrival time by the pre-arrival-schedule alert time. Next, the alert device 200 calculates a time later than the arrival-related time by the total time of the pre-arrival-schedule alert time and the post-arrival-schedule alert time, thereby calculating a time later than the scheduled arrival time by the post-arrival-schedule alert time. Thereafter, the alert device 200 sets the calculated time as the arrival alert end time.

Modification 5 of the Embodiment

In Modification 3 of the embodiment, the case where the departure-related time represented by the time information is the time earlier than the scheduled departure time by the pre-departure-schedule alert time was described as a concrete example, but Modification 3 is not limited to this. The departure-related time may be a time later than the scheduled departure time by the post-departure-schedule alert time. In this case, the alert device 200 may set the departure-related time as the departure alert end time. In addition, in this case, by calculating a time earlier than the departure-related time by the total time of the pre-departure-schedule alert time and the post-departure-schedule alert time, the alert device 200 may calculate a time earlier than the scheduled departure time by the pre-departure-schedule alert time, and may set the calculated time as the departure alert start time.

Modification 6 of the Embodiment

In Modification 4 of the embodiment, the case where the arrival-related time represented by the time information is the time earlier than the scheduled arrival time by the pre-arrival-schedule alert time was described as a concrete example, but Modification 4 is not limited to this. The arrival-related time may be a time later than the scheduled arrival time by the post-arrival-schedule alert time. In this case, the alert device 200 may set the arrival-related time as the arrival alert end time. In addition, in this case, by calculating a time earlier than the arrival-related time by the total time of the pre-arrival-schedule alert time and the post-arrival-schedule alert time, the alert device 200 may calculate a time earlier than the scheduled arrival time by the pre-arrival-schedule alert time, and may set the calculated time as the arrival alert start time.

Modification 7 of the Embodiment

In Modification 2 of the embodiment, the description was given that alert device 200 starts the departure alert and the arrival alert at timings based on the stored time information, but Modification 2 is not limited to this. The alert device 200 according to the present modification starts the departure alert at the timing based on the stored time information, while the alert device 200 starts the arrival alert at a timing of reception of an arrival alert start command that commands the start of the execution of the arrival alert.

Thus, at first, the departure alert executed in the present modification is described. As described in Modification 2 of the embodiment, upon receiving the departure schedule information from the alert control device 300, the alert device 200 according to the present modification stores the time information included in the received departure schedule information. Next, based on the stored time information, the alert device 200 sets the departure alert start time and the departure alert end time. Then, when the departure alert start time has come, the alert device 200 starts the execution of the departure alert. Next, upon receiving the departure command, the vehicle 100 that is loaded with an article departs from the port. Then, when the departure alert end time has come, the alert device 200 ends the execution of the departure alert. The vehicle 100 departing from the port moves to the delivery destination of the article, and finishes the delivery of the article.

Next, the arrival alert executed in the present modification is described. In the present modification, the arrival alert is started at a timing of reception of the arrival alert start command. The time when the arrival alert start command is received by the alert device 200 is determined by the timing when the arrival alert start command is transmitted by the alert control device 300. In the present embodiment, the alert control device 300 determines whether the timing of transmitting the arrival alert start command comes or not, based on the position of the vehicle 100.

Figure 9:
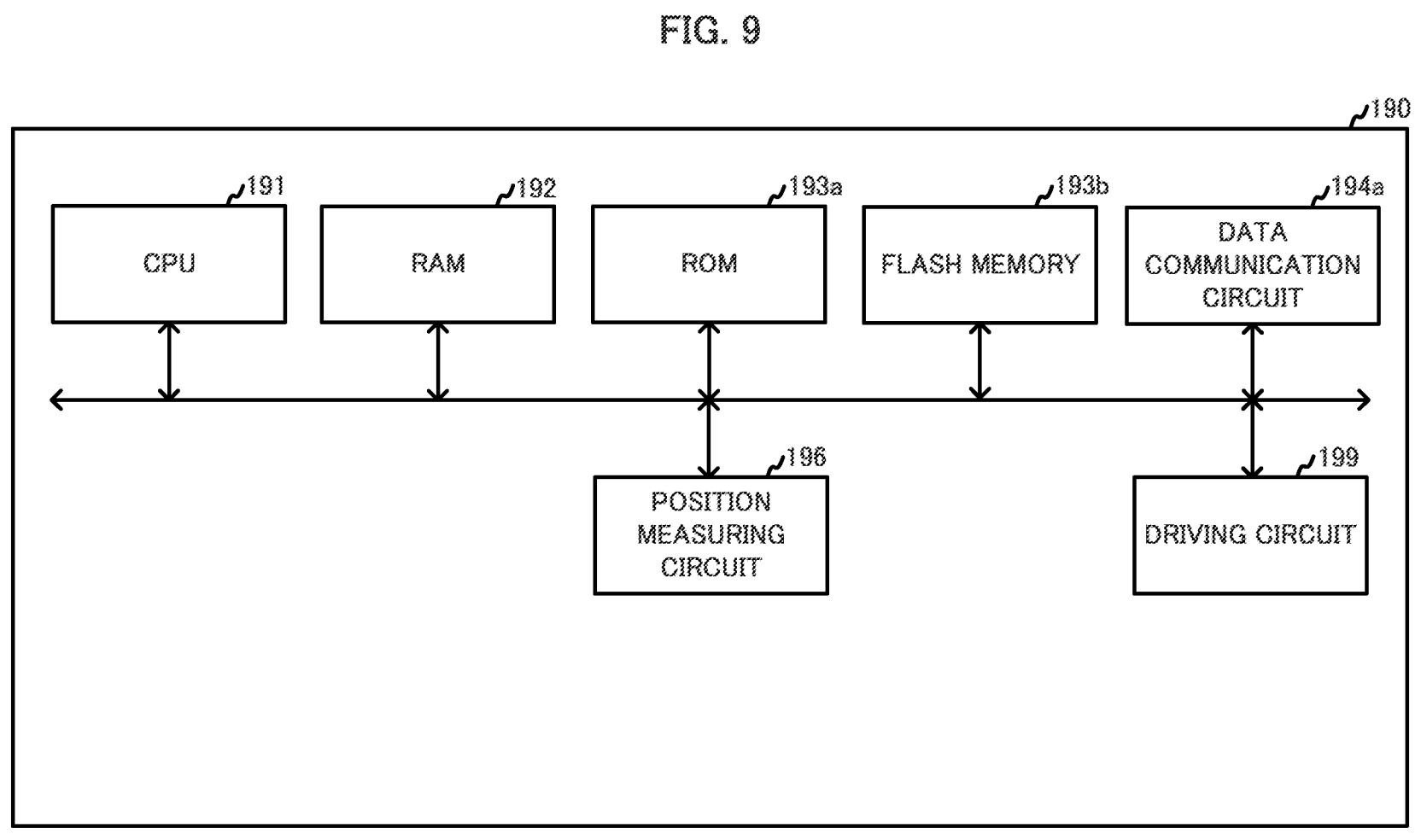

Thus, the vehicle 100 according to the present modification includes a control device 190 as illustrated in FIG. 9. The control device 190 includes, as hardware, a CPU 191, a RAM 192, a ROM 193a, a flash memory 193b, a data communication circuit 194a, a position measuring circuit 196, and a driving circuit 199. In the present modification, the vehicle 100 includes one CPU 191, but may include a plurality of CPUs. In addition, the vehicle 100 may include a plurality of RAMs and flash memories.

The structures and functions of the CPU 191, RAM 192, ROM 193a and data communication circuit 194a included in the vehicle 100 are similar to the structures and functions of the CPU 301, RAM 302, ROM 303a and data communication circuit 304a included in the alert control device 300. The flash memory 193b included in the vehicle 100 stores various programs, various data used in the execution of the programs, and a table storing data.

The position measuring circuit 196 of the vehicle 100 is a quasi-zenith satellite system (QZSS) circuit. The position measuring circuit 196 receives a radio signal that is emitted from a quasi-zenith satellite to the space, measures a latitude, a longitude and an altitude that represent the position of the vehicle 100, based on the received radio signal, and outputs a signal representing the measured latitude, longitude and altitude. The position measuring circuit 196 may be, not the QZSS circuit, but a global positioning system (GPS) circuit that receives a GPS signal emitted from a GPS satellite to the space, and measures the latitude, longitude and altitude representing the position of the vehicle 100, based on the received GPS signal.

The driving circuit 199 of the vehicle 100 is connected to non-illustrated cables that are connected to non-illustrated motors configured to rotate the propellers 111 to 114. The driving circuit 199 drives the motors in accordance with a control signal that is output from the CPU 191, thereby rotating the propellers 111 to 114.

When the data communication circuit 194a of the vehicle 100 receives the departure command from the vehicle control device 400 after the completion of the delivery of the article from the port to the delivery destination, the CPU 191 of the vehicle 100 acquires the departure command from the data communication circuit 194a, and acquires information representing a return route from the departure command. Then, the CPU 191 outputs to the driving circuit 199 connected to the propellers 111 to 114 a control signal for successively executing a takeoff from the delivery destination, a flight along the return route, and landing on the port.

In addition, the CPU 191 of the vehicle 100 acquires, at a predetermined cycle, a signal that is output from the position measuring circuit 196, acquires position information representing the position of the vehicle 100, based on the acquired signal, and outputs the acquired position information to the data communication circuit 194a, with the vehicle control device 400 being set as a destination. The data communication circuit 104a of the vehicle 100 transmits the output position information to the vehicle control device 400, and the vehicle control device 400 transfers the position information, which is received from the vehicle 100, to the alert control device 300.

When the data communication circuit 304a of the alert control device 300 according to the present modification receives the position information of the vehicle 100 from the vehicle control device 400, the CPU 301 of the alert control device 300 acquires the position information from the data communication circuit 304a. Next, the CPU 301 acquires the information representing a movement velocity of the vehicle 100 from the hard disk 303b. Then, CPU 301 calculates a movement time that is required for the vehicle 100 to move from the position of the vehicle 100 to the position of the port, based on the movement velocity represented by the acquired information, the position of the vehicle 100, and the return route of the vehicle 100. For this purpose, the CPU 301 calculates a distance over the return route from the position of the vehicle 100 to the position of the port, for example, based on the information representing the return route and the position information of the vehicle 100, and calculates the movement time by dividing the calculated distance by the movement velocity of the vehicle 100.

Next, the CPU 301 of the alert control device 300 acquires the information representing the pre-arrival-schedule alert time from the hard disk 303b, and determines whether or not the timing of transmitting the arrival alert start command has come, based on the pre-arrival-schedule alert time represented by the acquired information, and the calculated movement time of the vehicle 100. In the present modification, the timing of transmitting the arrival alert start command is the timing when the vehicle 100 approaches the port, but the present modification is not limited to this. In addition, in the present modification, that the vehicle 100 approaches the port means that the distance from the vehicle 100 to the port becomes equal to or less than the distance of movement of the vehicle 100 in the pre-scheduled arrival time, but the present modification is not limited to this.

Thus, when the CPU 301 of the alert control device 300 determines that the length of the movement time of the vehicle 100 is longer than the length of the pre-arrival-schedule alert time, since the vehicle 100 does not approach the port, the CPU 301 of the alert control device 300 determines that the timing of transmitting the arrival alert start command has not come. Next, the CPU 301 halts the output and transmission of the arrival alert start command until the position information of the vehicle 100 is newly received.

On the other hand, in the present modification, when the CPU 301 of the alert control device 300 determines that the length of the movement time of the vehicle 100 is equal to or less than the length of the pre-arrival-schedule alert time, since the vehicle 100 approaches the port, the CPU 301 of the alert control device 300 determines that the timing of transmitting the arrival alert start command has come. Next, the CPU 301 outputs the arrival alert start command to the data communication circuit 304a, with the alert device 200 being set as a destination, and the data communication circuit 304a transmits the arrival alert start command to the alert device 200.

When the data communication circuit 294a of the alert device 200 according to the present modification receives the arrival alert start command, the controller 920 determines that the arrival alert start time has come, and executes the arrival alert start control for the alertors 231 to 233. In this manner, the controller 920 controls the alertors 231 to 233 in order for causing the alertors 231 to 233 to start the execution of the arrival alert, at the timing of reception of the arrival alert start command.

Based on the signal output from the position measuring circuit 196, the CPU 191 of the vehicle 100 moving toward the port acquires the position information at a predetermined cycle. Next, the CPU 191 determines whether or not the vehicle 100 has arrived above the port that is the end point of the return route, based on the acquired position information and the information representing the return route. In the present modification, the position information represents the position of the vehicle 100 by using the latitude, longitude and altitude. In addition, the information representing the return route includes the position information representing the positions of a plurality of nodes included in the return route by the latitude, longitude and altitude, and the information representing the order of arrival at the nodes. Thus, in the present modification, the CPU 191 acquires, from the information representing the return route, the position information representing the position of the last node in the order of arrival. Next, the CPU 191 calculates a distance between the position of the vehicle 100 and the position of the last node, based on the latitude, longitude and altitude represented by the acquired position information, and determines whether or not the calculated distance is equal to or less than a predetermined distance.

At this time, when the calculated distance is greater than the predetermined distance, the CPU 191 of the vehicle 100 determines that the vehicle 100 has not arrived above the port. On the other hand, when the calculated distance is equal to or less than the predetermined distance, the CPU 191 determines that the vehicle 100 has arrived above the port. Next, the CPU 191 outputs the control signal for landing on the port to the driving circuit 199 connected to the propellers 111 to 114. Thereafter, when the vehicle 100 lands on the port, the CPU 191 of the vehicle 100 outputs to the data communication circuit 194a an arrival report indicating the arrival at the port, with the vehicle control device 400 being set as a destination. Then, the data communication circuit 194a of the vehicle 100 transmits the arrival report to the vehicle control device 400, and the vehicle control device 400 transfers the arrival report to the alert control device 300.

When the data communication circuit 304a of the alert control device 300 receives the arrival report, the CPU 301 of the alert control device 300 determines that a timing of transmitting a command commanding the end of the execution of the arrival alert (hereinafter referred to as "arrival alert end command") has come. Next, the CPU 301 outputs the arrival alert end command to the data communication circuit 304a, with the alert device 200 being set as a destination, and the data communication circuit 304a transmits the arrival alert end command to the alert device 200.

When the data communication circuit 294a of the alert device 200 receives the arrival alert end command, the controller 920 determines that the arrival alert end time has come, and executes the arrival alert end control for the alertors 231 to 233. In this manner, the controller 920 controls the alertors 231 to 233 for causing the alertors 231 to 233 to end the execution of the arrival alert, at the timing of reception of the arrival alert end command.

According to these configurations, the controller 920 of the alert device 200 controls the alertors 231 to 233 in order for causing the alertors 231 to 233 to start the execution of the departure alert, at the timing based on the departure-related time represented by the time information. The departure-related time is the time relating to the scheduled departure time, and the time information representing the departure-related time is the information received by the alert device 200 from the alert control device 300 and is the information that the alert device 200 stores after the reception. On the other hand, the controller 920 of the alert device 200 controls the alertors 231 to 233 in order for causing the alertors 231 to 233 to start the execution of the arrival alert, at the timing of reception of the arrival alert start command from the alert control device 300. Here, at the time of landing of the vehicle 100, unlike the time of the takeoff, disturbance is large and the possibility of landing as scheduled is not high. Thus, the alert control device 300 directly controls the alert device 200, and changes the control mode of the alert device 200 between the landing and the takeoff, thus being able to execute an appropriate alert according to the situation.

As an example of the case where the disturbance at the time of landing is greater than the disturbance at the time of departure, a case can be given in which, while the vehicle 100 only needs to receive the departure command at the scheduled departure time in order for the vehicle 100 to depart from the port at the scheduled departure time, the vehicle 100 has to continuously move along the return route that was used in the determination of the scheduled arrival time, at the movement velocity that was used in the determination of the scheduled arrival time, in order for the vehicle 100 to arrive at the port at the scheduled arrival time. Even in such a case, a decrease in accuracy of the alert can be suppressed by starting, by the alert device 200, the arrival alert relating to the arrival of the vehicle 100, which is less likely achieved as scheduled, at the timing of reception of the arrival alert start command from the alert control device 300. In addition, even when the quality of communication with the alert control device 300 is lowered after the reception of the time information, a decrease in accuracy of the alert can be suppressed by starting the departure alert relating to the departure of the vehicle 100, which is highly likely achieved as scheduled, at the timing based on the departure-related time that is the scheduled departure time.

Modification 8 of the Embodiment

In Modification 7 of the embodiment, the description was given that the alert device 200 starts the arrival alert at the timing of reception of the arrival alert start command from the alert control device 300. However, when the quality of communication with the alert control device 300 is lowered, since the alert device 200 cannot receive the arrival alert start command from the alert control device 300, the alert device 200 cannot start the execution of the arrival alert even when the vehicle 100 approaches the port.

At this time, in the present modification, a worker staying at the position of the alert device 200, or staying at a position near the alert device 200, confirms the approach of the vehicle 100 to the port, for example, by at least either hearing of sound, such as sound of flying, caused by the vehicle 100, or visual observation of the vehicle 100. Next, upon confirming that the alert device 200 has not started the arrival alert, the worker executes an operation of starting the execution of the arrival alert (hereinafter referred to as "arrival alert start operation") on a non-illustrated input device that the alert device 200 includes. In the present modification, the worker that executes the arrival alert start operation is also called "operator", since the worker operates the alert device 200.

The non-illustrated input device included in the alert device 200 is at least one of a keyboard, a mouse, a touch pad, or a button, and outputs a signal corresponding to an operation. When the acquirer 910 of the alert device 200 acquires a signal corresponding to the arrival alert start operation from the input device, the controller 920 executes the arrival alert start control and the alertors 231 to 233 start the arrival alert.

Then, upon confirming that the vehicle 100 landed on the port, the worker executes an operation for ending the execution of the arrival alert (hereinafter referred to as "arrival alert end operation") on the input device of the alert device 200. When the acquirer 910 of the alert device 200 acquires a signal corresponding to the arrival alert end operation from the input device, the controller 920 executes the arrival alert end control and the alertors 231 to 233 terminate the arrival alert.

According to these configurations, when the vehicle 100 approaches the port, even when the alert device 200 cannot receive the arrival alert start command due to a decrease in quality of communication between the alert device 200 and the alert control device 300, the alert device 200 can start the arrival alert when the worker staying at the position of the alert device 200 or at a position near the alert device 200 only confirms the approach of the vehicle 100 and executes the arrival alert start operation on the alert device 200. Thus, since the failure to execute the arrival alert can be prevented when the vehicle 100 approaches the port, a decrease in safety can be suppressed.

Modification 9 of the Embodiment

In Modification 7 of the embodiment, the description was given that the controller 920 of the alert device 200 executes the departure alert end control at the timing based on the time information stored in the storer 990. However, Modification 7 is not limited to this, and in the present modification, the controller 920 of the alert device 200 executes the departure alert end control at a timing of reception of a command that commands the end of the execution of the departure alert (hereinafter referred to as "departure alert end command").

A worker according to the present modification searches for an article that is to be delivered by the vehicle 100, for example, from shelves of a warehouse or a store, and causes the searched article to be loaded in the surrounding-and-holding frames 121*a* and 121*b* of the vehicle 100. When the alert device 200 starts the departure alert before the worker finishes the loading of the article in the vehicle 100, the worker executes an operation of causing the vehicle 100 to halt the departure (hereinafter referred to as "departure halt operation") on the non-illustrated input device included in the vehicle 100. The structure and function of the input device included in the vehicle 100 are similar to the structure and function of the input device 305*c* included in the alert control device 300.

When a signal corresponding to the departure halt operation is output from the input device, the CPU 191 of the vehicle 100 changes a departure halt flag stored in the flash memory 193*b*, from a value "false" indicating that the departure is not halted, to a value "true" indicating that the departure is halted. Thereafter, when the data communication circuit 194*a* of the vehicle 100 receives the departure command, the CPU 191 executes a process of acquiring the departure halt flag from the flash memory 193*b*. Next, the CPU 191 determines whether the value of the acquired departure halt flag is "true" or not. At this time, when the CPU 191 determines that the value of the departure halt flag is "true", the CPU 191 halts the output of the control signal for departure from the port and the control signal for movement along the delivery route. Thus, the vehicle 100 halts the departure from the port at the timing of the reception of the departure command. Then, after a sleep is executed over a predetermined time, the CPU 191 repeats the above-described process from the process of acquiring the departure halt flag.

When the loading of the article in the vehicle 100 is completed, the worker executes an operation of canceling the halt of the departure (hereinafter referred to as "departure halt cancel operation") on the input device of the vehicle 100. When a signal corresponding to the departure halt cancel operation is output from the input device, the CPU 191 of the vehicle 100 executes a sleep over a total time of the port leaving required time and the allowable time, and then changes the departure halt flag stored in the flash memory 193*b* to the value "false" indicating that the departure is not halted. The time of the sleep of the CPU 191 of the vehicle 100 is not limited to the total time of the port leaving required time and the allowable time, and may be the port leaving required time.

After repeating the above-described process from the process of acquiring the departure halt flag, when the CPU 191 of the vehicle 100 determines that the value of the acquired departure halt flag is "false", the CPU 191 outputs the control signal for departure from the port.

Thereafter, the CPU 191 of the vehicle 100 outputs a departure report, which reports the departure from the port, to the data communication circuit 194*a*, with the vehicle control device 400 being set as a destination. The data communication circuit 194*a* of the vehicle 100 transmits the departure report to the vehicle control device 400, and the vehicle control device 400 transfers the departure report to the alert control device 300. Then, the CPU 191 of the vehicle 100 outputs the control signal for the movement along the delivery route.

When the data communication circuit 304a of the alert control device 300 receives the departure report, the CPU 301 of the alert control device 300 measures an elapsed time from the time of reception of the departure report, by using a hardware timer or a software timer. Next, the CPU 301 acquires information representing the post-departure-schedule alert time from the hard disk 303b. Thereafter, the CPU 301 executes a process of determining whether or not the length of the elapsed time is equal to or greater than the length of the post-departure-schedule alert time. At this time, when the CPU 301 determines that the length of the elapsed time is less than the length of the post-departure-schedule alert time, the CPU 301 determines that a timing of transmitting the departure alert end command has not come. Next, after executing a sleep over a predetermined time, the CPU 301 executes once again the process of determining whether or not the length of the elapsed time is equal to or greater than the length of the post-departure-schedule alert time.

On the other hand, when the CPU 301 of the alert control device 300 determines that the length of the elapsed time is equal to or greater than the length of the post-departure-schedule alert time, the CPU 301 determines that the timing of transmitting the departure alert end command has come. Next, the CPU 301 outputs the departure alert end command to the data communication circuit 304a, with the alert device 200 being set as a destination. Thereafter, the data communication circuit 304a of the alert control device 300 transmits the departure alert end command to the alert device 200. When the data communication circuit 294a of the alert device 200 receives the departure alert end command, the controller 920 of the alert device 200 executes the departure alert end control.

According to these configurations, the data communication circuit 294a of the alert device 200 receives, after the departure of the vehicle 100, the departure alert end command that commands the end of the execution of the departure alert from the alert control device 300. In addition, the controller 920 of the alert device 200 controls the alertors 231 to 233 in order for causing the alertors 231 to 233 to end the execution of the departure alert, at the timing of reception of the departure alert end command. Thus, compared to the case of ending the execution of the departure alert at the timing based on the departure-related time, the alert device 200 can more surely end the execution of the departure alert after the departure of the vehicle 100 from the port. In other words, compared to the case of ending the execution of the departure alert at the timing based on the departure-related time, the alert device 200 can more surely prevent the execution of the departure alert from ending before the vehicle 100 departs from the port.

Furthermore, according to these configurations, when the quality of communication between the alert device 200 and the alert control device 300 is lowered after the alert device 200 receives the time information representing the departure-related time, since the alert device 200 does not receive the departure alert end command, the alert device 200 cannot end the departure alert, but the alert device 200 can, at least, start the departure alert at the timing based on the departure-related time. Thus, even when the quality of communication is lowered after the reception of the time information, the alert device 200 can suppress a decrease in safety of a person staying at the port.

Modification 10 of the Embodiment

In Modification 9 of the embodiment, the description was given that the alert device 200 ends the departure alert at the timing of reception of the departure alert end command from the alert control device 300. However, when the quality of communication with the alert control device 300 is lowered, the alert device 200 cannot receive the departure alert end command from the alert control device 300, and thus cannot end the execution of the departure alert. Thus, in the present modification, the alert control device 300 transmits, to a non-illustrated terminal device that a worker carries, a departure alert end operation command that commands the worker to execute an operation of ending the execution of the departure alert (hereinafter referred to as "departure alert end operation"). Upon receiving the departure alert end operation command, the terminal device of the worker executes at least either display or audio output, which represents the reception of the departure alert end operation command. Thereafter, when the worker confirms at least either the display or the audio output, the worker executes the departure alert end operation on the alert device 200.

Thus, when the data communication circuit 294a receives the departure alert end command, the controller 920 of the alert device 200 according to the present modification executes the departure alert end control for the alertors 231 to 233. Thereafter, the controller 920 of the alert device 200 outputs to the data communication circuit 294a a departure alert end report that reports the end of the execution of the departure alert, with the alert control device 300 being set as a destination. Thereafter, the data communication circuit 294a of the alert device 200 transmits the departure alert end report to the alert control device 300. On the other hand, when the data communication circuit 294a does not receive the departure alert end command, the controller 920 neither executes the departure alert end control, nor outputs the departure alert end report.

When the CPU 301 of the alert control device 300 according to the present modification outputs the departure alert end command to the data communication circuit 304a, with the alert device 200 being set as a destination, the CPU 301 of the alert control device 300 starts to measure an elapsed time from the output time of the departure alert end command, by using a non-illustrated hardware timer or a non-illustrated software timer. Next, the CPU 301 acquires from the hard disk 303b information representing an allowable time that is preset as a time required from the output of the departure alert end command to the acquisition of the departure alert end report. A person skilled in the art can determine the length of a preferable allowable time by experiments.

Next, the CPU 301 of the alert control device 300 executes a process of trying to acquire the departure alert end report from the data communication circuit 304a. At this time, when the CPU 301 does not acquire the departure alert end report, the CPU 301 determines whether or not the length of the elapsed time from the output time of the departure alert end command is equal to or less than the length of the allowable time represented by the acquired information. At this time, when the CPU 301 determines that the length of the elapsed time is equal to or less than the length of the allowable time, the CPU 301 executes a sleep over a predetermined time and then repeats the above-described process from the process of trying to acquire the departure alert end report.

On the other hand, when the CPU 301 of the alert control device 300 determines that the length of the elapsed time is longer than the length of the allowable time, the CPU 301 determines that there is a possibility that the quality of communication between the alert control device 300 and the alert device 200 is lowered and the departure alert end command fails to be received by the alert device 200. Next, the CPU 301 acquires from the hard disk 303b information representing a communication address allocated to the terminal device of a worker staying at the position of the alert device 200 or at a position near the alert device 200. Then, the CPU 301 outputs the departure alert end operation command to the data communication circuit 304a, with the communication address represented by the acquired information being set as a destination. The data communication circuit 304a of the alert control device 300 transmits the departure alert end operation command to the terminal device of the worker.

On the other hand, when the CPU 301 of the alert control device 300 acquires the departure alert end report, the CPU 301 determines that the quality of communication between the alert control device 300 and alert device 200 is not lowered, and the departure alert end command was received by the alert device 200, and halts the output of the departure alert end operation command. Thus, the alert control device 300 does not transmit the departure alert end operation command to the terminal device of the worker.

The terminal device of the worker is (i), for example, a smartphone, or a tablet-type or notebook-type personal computer, and (ii) is carried by the worker. The terminal device of the worker includes, as hardware, a CPU, a RAM, a ROM, a flash memory, a data communication circuit, a video card, a display panel, and an input device, which are not illustrated. The structures and functions of the hardware of the terminal device are similar to the structures and functions of the hardware of the alert control device 300. Besides, the terminal device of the worker includes a non-illustrated speaker, and outputs an audio, based on the signal output from the CPU.

When the data communication circuit of the terminal device receives the departure alert end operation command, the CPU of the terminal device controls at least one of the display panel or the speaker, in order for causing the at least one of the display panel or the speaker to execute at least either display or audio output, which represents the reception of the departure alert end operation command. When the worker confirms at least either the display or the audio output, the worker executes the departure alert end operation on the non-illustrated input device of the alert device 200. When the input device of the alert device 200 outputs a signal corresponding to the departure alert end operation, the CPU 291 of the alert device 200 executes the departure alert end control. In this manner, the alertors 231 to 233 of the alert device 200 terminate the execution of the departure alert.

According to these configurations, the alert system 1 includes the alert device 200 and the alert control device 300. In addition, when the alert device 200 of the alert system 1 receives from the alert control device 300 the departure alert end command that commands the end of the execution of the departure alert, the alert device 200 terminates the execution of the departure alert, and transmits to the alert control device 300 the departure alert end report that reports the end of the execution of the departure alert. On the other hand, when the alert device 200 does not receive the departure alert end command, the alert device 200 neither terminates the execution of the departure alert nor transmits the departure alert end report. When the alert control device 300 does not receive the departure alert end report even after the passage of the predetermined allowable time from the time when the departure alert end command was transmitted, the alert control device 300 transmits the departure alert end operation command, which commands the execution of the operation for ending the execution of the departure alert, to the terminal device of the operator that stays at the position of the alert device 200 or at a position near the alert device 200. Thus, the alert system 1 can terminate the execution of the departure alert, even in the case where the quality of communication between the alert device 200 and the alert control device 300 is lowered.

Modification 11 of the Embodiment

In Modification 10 of the embodiment, the description was given that the terminal device that the worker carries executes at least either the display or the audio output, which represents the reception of the departure alert end operation command, but Modification 10 is not limited to this. The terminal device of the worker according to the present modification executes at least either display or audio output, which represents the reception of the arrival alert start operation command that commands the execution of the operation for starting the execution of the arrival alert. In addition, when the worker according to the present modification confirms at least either the display or the audio, the worker executes the arrival alert start operation on the alert device 200.

Thus, when the alert device 200 according to the present modification receives the arrival alert start command, the alert device 200 executes the arrival alert start control for the alertors 231 to 233, and then transmits to the alert control device 300 an arrival alert start report that reports that the execution of the arrival alert was started. On the other hand, when the alert device 200 does not receive the arrival alert start command, the alert device 200 neither executes the arrival alert start control, nor transmits the arrival alert start report.

Upon transmitting the arrival alert start command to the alert device 200, the alert control device 300 according to the present modification starts measuring the elapsed time from the transmission time of the arrival alert start command. When the alert control device 300 receives the arrival alert start report while the length of the elapsed time is equal to or less than the length of the allowable time that is preset as a time required from the transmission of the arrival alert start command to the acquisition of the arrival alert start report, the alert control device 300 does not transmit the arrival alert start operation command to the terminal device of the worker. On the other hand, when the alert control device 300 does not receive the arrival alert start report even after the length of the elapsed time becomes longer than the length of the allowable time, the alert control device 300 transmits the arrival alert start operation command to the terminal device of the worker.

When the terminal device of the worker receives the arrival alert start operation command, the terminal device executes at least either display or audio output, which represents the reception of the command. When the worker confirms at least either the display or the audio, the worker executes the arrival alert start operation on the alert device 200, and the alert device 200 starts the execution of the arrival alert in accordance with this operation.

In the present modification, the description was given that the terminal device executes at least either the display or the audio output, which represents the reception of the arrival alert start operation command, but the present modification is not limited to this. The terminal device may execute at least either display or audio output, which represents the reception of an arrival alert end operation command that commands execution of an operation of ending the execution of the arrival alert. In this case, when the worker confirms at least either the display or the audio, the worker may execute the arrival alert end operation on the alert device 200.

Modification 12 of the Embodiment

In the embodiment, the description was given that the 7-segment display 232 of the alert device 200 executes the departure alert by displaying at least one of a predetermined character string, a predetermined character, or a predetermined symbol. In the present modification, when the storer 990 stores the time information representing the departure-related time, the 7-segment display 232 executes display indicating that the time information is being stored (hereinafter referred to as "departure-related time storage display") until the start of the execution of the departure alert.

For this purpose, the CPU 291 of the alert device 200, when the alert device 200 is started up, executes a non-illustrated display control process in order to cause the 7-segment display 232 to execute the departure-related time storage display. When the execution of the display control process is started, the acquirer 910 of the alert device 200 executes a process of trying to acquire the time information from the storer 990. At this time, when the time information is not acquired, the controller 920 controls the 7-segment display 232 in order for causing the 7-segment display 232 to execute predetermined initial display. Then, after a sleep is executed over a predetermined time, the execution of the process of trying to acquire the time information is repeated.

On the other hand, when the time information is acquired, the acquirer 910 of the alert device 200 acquires information representing the departure alert start time from the storer 990. Next, the acquirer 910 executes, for example, a process of acquiring information representing the system time from the OS. Thereafter, when the system time represented by the acquired information is a time earlier than the departure alert start time, the controller 920 controls the 7-segment display 232 in order for causing the 7-segment display 232 to start the departure-related time storage display. Then, the above-described process is repeated from the process of acquiring the information representing the system time.

On the other hand, when the system time is a time at or later than the departure alert start time, the controller 920 of the alert device 200 controls the 7-segment display 232 in order for causing the 7-segment display 232 to end the departure-related time storage display. Thereafter, the above-described process is repeated from the process of trying to acquire the time information.

Modification 13 of the Embodiment

In Modification 12 of the embodiment, the description was given that the 7-segment display 232 of the alert device 200 executes the departure-related time storage display until the 7-segment display 232 starts the execution of the departure alert, from when the storer 990 stores the time information representing the departure-related time. However, Modification 12 is not limited to this, and the 7-segment display 232 may not execute the departure alert, and may execute the departure-related time storage display until at least one of the speaker 231 or the patlamp 233 ends the execution of the departure alert, from when the storer 990 stores the time information.

In addition, until the 7-segment display 232 starts the execution of the arrival alert, from when the storer 990 stores time information representing the arrival-related time, the 7-segment display 232 of the alert device 200 may execute display indicating that the time information is stored (hereinafter referred to as "arrival-related time storage display"). Besides, the 7-segment display 232 may not execute the arrival alert, and may execute the arrival-related time storage display until at least one of the speaker 231 or the patlamp 233 ends the execution of the arrival alert, from when the storer 990 stores the time information.

Modification 14 of the Embodiment

In Modification 12 of the embodiment, the description was given that the 7-segment display 232 of the alert device 200 executes the departure-related time storage display, but Modification 12 is not limited to this. The 7-segment display 232 according to the present modification executes display of a remaining time up to the scheduled departure time from the system time, until the scheduled departure time of the vehicle 100 from when the storer 990 stores the time information. In the present modification, like the embodiment, a case where the departure-related time is the scheduled departure time is described by way of example.

For this purpose, the CPU 291 of the alert device 200, when the alert device 200 is started up, executes a non-illustrated display control process in order to cause the 7-segment display 232 to display the remaining time. When the display control process is started, the acquirer 910 of the alert device 200 executes a process of trying to acquire time information from the storer 990. At this time, when the time information is not acquired, the controller 920 controls the 7-segment display 232 in order for the 7-segment display 232 to execute predetermined initial display. Then, after a sleep is executed over a predetermined time, the process of trying to acquire the time information is repeated.

On the other hand, when the time information is acquired, the acquirer 910 of the alert device 200 acquires information representing the departure alert start time from the storer 990. Next, the acquirer 910 executes, for example, a process of acquiring information representing the system time from the OS. Thereafter, when the system time represented by the acquired information is a time earlier than the scheduled departure time, the controller 920 calculates a remaining time to the scheduled departure time, by subtracting the system time from the departure-related time represented by the time information. The reason why the remaining time is calculated in this manner is that in the present modification, the description is given by taking, as a concrete example, the case where the departure-related time is the scheduled departure time.

Thereafter, the controller 920 of the alert device 200 controls the 7-segment display 232 in order for causing the 7-segment display 232 to display the remaining time up to the scheduled departure time. Thereafter, the above-described process is repeated from the process of acquiring the information representing the system time. In this manner, the 7-segment display 232 executes a countdown up to the scheduled departure time, by repeating the display of the remaining time until the scheduled departure time comes.

On the other hand, when the system time is a time at or later than the departure alert start time, the controller 920 of the alert device 200 controls the 7-segment display 232 in order for causing the 7-segment display 232 to end the display of the remaining time and to execute initial display. Thereafter, the above-described process is repeated from the process of trying to acquire the time information.

Here, because of a change of the departure-related time of the vehicle 100, when the data communication circuit 294*a* of the alert device 200 receives new time information representing a changed departure-related time (hereinafter referred to also as "new departure-related time") from the alert control device 300, the controller 920 of the alert device 200 terminates the execution of the non-illustrated display control process, and controls the 7-segment display 232 in order for causing the 7-segment display 232 to execute initial display. By this control, the 7-segment display 232 halts the display of the remaining time. Next, the CPU 291 of the alert device 200 starts the execution of a non-illustrated information update process. In the present modification, the following description is given by taking as an example a case where the new departure-related time is a new scheduled departure time.

When the execution of the information update process is started, the acquirer 910 of the alert device 200 acquires new time information from the data communication circuit 294*a*. Thereafter, the controller 920 updates the time information stored in the storer 990 with the new time information. Next, the controller 920 of the alert device 200 sets a new departure alert start time and a new departure alert end time, based on the new departure-related time represented by the new time information. Then, the controller 920 updates the information representing the departure alert start time stored in the storer 990, with the information representing the new departure alert start time, and updates the information representing the departure alert end time stored in the storer 990, with the information representing the new departure alert end time. Subsequently, the alert device 200 terminates the execution of the information update process.

Thereafter, by executing once again the non-illustrated display control process, the CPU 291 of the alert device 200 starts display of a new remaining time up to the new scheduled departure time from the system time. By this control, when the scheduled departure time is changed to a time later than before the change, the 7-segment display 232 executes a backward shift of the countdown up to the scheduled departure time, and when the scheduled departure time is changed to a time earlier than before the change, the 7-segment display 232 executes a forward shift of the countdown up to the scheduled departure time.

In the present modification, the description was given by taking, as a concrete example, the case where the vehicle-related time represented by the time information is the scheduled departure time, and the remaining time is the time from the system time up to the scheduled departure time represented by the time information. However, the present modification is not limited to this, and the vehicle-related time represented by the time information may be a time earlier than the scheduled departure time by the pre-departure-schedule alert time, or a time later than the scheduled departure time by the post-departure-schedule alert time. In addition, in this case, the remaining time may be a time from the system time up to the scheduled departure time obtained based on the time information.

Modification 15 of the Embodiment

In Modification 14 of the embodiment, the description was given that the 7-segment display 232 of the alert device 200 executes the display of the remaining time up to the scheduled departure time from the system time, until the coming of the scheduled departure time of the vehicle 100 from when the storer 990 stores the time information. However, Modification 14 is not limited to this, and the 7-segment display 232 may execute display of an remaining time up to the scheduled arrival time from the system time, until the coming of the scheduled arrival time of the vehicle 100 from when the storer 990 stores the time information. In addition, when new time information is received while the 7-segment display 232 is displaying the remaining time up to the scheduled arrival time, the 7-segment display 232 may halt the display of the remaining time, and may start display of a new remaining time from the system time to a new scheduled arrival time represented by the new time information.

In the present modification, the description was given by taking, as a concrete example, the case where the vehicle-related time represented by the time information is the scheduled arrival time, and the remaining time is the time from the system time up to the scheduled arrival time represented by the time information. However, the present modification is not limited to this, and the vehicle-related time represented by the time information may be a time earlier than the scheduled arrival time by the pre-arrival-schedule alert time, or a time later than the scheduled arrival time by the post-arrival-schedule alert time. In addition, in this case, the remaining time may be a time from the system time up to the scheduled arrival time obtained based on the time information.

Modification 16 of the Embodiment

In Modification 1 of the embodiment, the description was given that the alert device 200 starts the execution of the arrival alert at the timing based on the stored time information. In addition, in Modification 7 of the embodiment, the description was given that the alert device 200 starts the execution of the arrival alert at the timing of the reception of the arrival alert start command. However, Modification 1 and Modification 7 are not limited this, and Modification 1 of the embodiment and Modification 7 of the embodiment can be combined.

In the present modification that is a combination of Modification 1 of the embodiment and Modification 7 of the embodiment, the alert device 200 tries reception of a heartbeat from the alert control device 300, and determines whether or not the communication between the alert device 200 and the alert control device 300 is possible, based on whether or not the heartbeat can be received. When the arrival alert start command is received while the communication is determined to be possible, the alert device 200 starts the execution of the arrival alert at the timing of the reception of the arrival alert start command. On the other hand, while the communication is determined to be not possible and to be disabled, when the execution of the arrival alert is not started and when the timing based on the stored vehicle-related time comes, or has already come, the alert device 200 starts the execution of the arrival alert. In the present modification, like Modification 1 of the embodiment, the following description is given by taking, as a concrete example, a case where the vehicle-related time that is the time relating to the vehicle 100 is the scheduled arrival time of the vehicle 100 at the port.

For this purpose, when the vehicle 100 according to the present modification receives a departure command after finishing the delivery of an article to the delivery destination from the port, the vehicle 100 departs from the delivery destination and starts moving along the return route to the port. Then, the vehicle 100 acquires a signal output from the position measuring circuit 196, at a predetermined cycle (hereinafter referred to as "position transmission cycle"). The position measuring circuit 196 according to the present modification is the QZSS circuit or GPS circuit described in Modification 7 of the embodiment.

Next, based on the acquired signal, the vehicle 100 acquires the position information representing the position of the vehicle 100, and transmits the acquired position information to the vehicle control device 400. Upon receiving the position information, the vehicle control device 400 transfers the position information to the alert control device 300.

The alert control device 300 according to the present modification transmits the departure command to the vehicle 100 via the vehicle control device 400. Thereafter, the data communication circuit 304a of the alert control device 300 tries reception of position information transmitted at the position transmission cycle from vehicle 100 that departed from the port. When the position information is received, the CPU 301 of the alert control device 300 executes a non-illustrated position information update process, thereby acquiring the position information from the data communication circuit 304a. Next, the CPU 301 newly saves or overwrite-saves the acquired position information in the hard disk 303b, and then terminates the execution of the position information update process. In this manner, the position information that the hard disk 303b stores is updated at the position transmission cycle.

Upon ending the execution of the position information update process, the alert control device 300 executes the process described in Modification 7 of the embodiment, in order to determine whether or not the vehicle 100 approaches the port, based on the updated position information. In this manner, since the alert control device 300 determines whether or not the vehicle 100 approaches the port, at the position transmission cycle, the position transmission cycle is referred to also as "approach determination cycle" in the description below.

At this time, when the alert control device 300 determines that the timing of transmitting the arrival alert start command has not come since the vehicle 100 does not approach the port, the alert control device 300 halts the transmission of the arrival alert start command. On the other hand, when the alert control device 300 determines that the timing of transmitting the arrival alert start command has come since the vehicle 100 approaches the port, the alert control device 300 transmits the arrival alert start command to the alert device 200.

After transmitting the departure command, the alert control device 300 executes the process described in Modification 1 of the embodiment in order to determine the scheduled arrival time of the vehicle 100 at the port. Next, the alert control device 300 generates arrival schedule information including the time information representing the determined scheduled arrival time, and transmits the generated arrival schedule information to the alert device 200.

When first arrival schedule information is transmitted after the departure command is transmitted, the CPU 301 of the alert control device 300 executes a non-illustrated arrival schedule update process that updates the arrival schedule information at a predetermined cycle (hereinafter referred to as "arrival schedule update cycle"). In the present modification, the length of the arrival schedule update cycle is preset to be longer than the length of the approach determination cycle, but is not limited to this. The length of the arrival schedule update cycle may be set to be equal to the length of the approach determination cycle, or may be set to be less than the length of the approach determination cycle.

Upon starting the execution of the arrival schedule update process, the CPU 301 of the alert control device 300 acquires the updated position information from the hard disk 303b, and executes the process described in Modification 1 of the embodiment by using the acquired position information. Thereby, based on the updated position information, the alert control device 300 determines a new scheduled arrival time of the vehicle 100 at the port. Next, the alert control device 300 updates the arrival schedule, based on the new scheduled arrival time. Thereafter, the alert control device 300 generates new arrival schedule information (i) representing the updated arrival schedule and (ii) including the time information representing the new scheduled arrival time. Next, the alert control device 300 transmits the generated new arrival schedule information to the alert device 200 as a heartbeat, and terminates the execution of the arrival schedule update process. In this manner, since the alert control device 300 updates the arrival schedule at the arrival schedule update cycle, and transmits the new arrival schedule information representing the updated arrival schedule as the heartbeat, the arrival schedule update cycle is also referred to as "heartbeat transmission cycle".

The alert device 200 according to the present modification, when the alert device 200 is started up, executes an arrival information acquisition process as illustrated in FIG. 10. Upon starting the execution of the arrival information acquisition process, the alert device 200 executes the process described in Modification 1 of the embodiment, thereby trying to acquire the first arrival schedule information, or the heartbeat that is the new arrival schedule information (step S31). At this time, when neither the first arrival schedule information nor the new arrival schedule information is acquired (step S32, No), the alert device 200 repeats the above-described process from the process of step S31 after a sleep over a predetermined time.

On the other hand, when the first arrival schedule information or the new arrival schedule information is acquired (step S32, Yes), the acquirer 910 of the alert device 200 acquires, for example, from the OS, the information representing the system time, as a reception time of the received first arrival schedule information or the new arrival schedule information (hereinafter referred to simply as "received arrival schedule information"). Next, the controller 920 determines that the communication between the alert device 200 and the alert control device 300 was possible at the reception time represented by the acquired information.

Next, the acquirer 910 of the alert device 200 acquires from the storer 990 information representing a length of a period over which the communication between the alert device 200 and the alert control device 300 is predicted to continue to be possible (hereinafter referred to as "predicted length"). In the present modification, the predicted length is preset to be a length of the heartbeat transmission cycle, but is not limited to this, and the predicted length may be preset to be a length equal to or greater than the length of the heartbeat transmission cycle. In addition, a person skilled in the art can determine a preferable predicted length by experiments.

Thereafter, the controller 920 of the alert device 200 sets a period (i) with a start time being the reception time of the arrival schedule information and (ii) with an end time being a time later than the reception time by the time of the predicted length represented by the acquired information, as a period over which the communication between the alert device 200 and the alert control device 300 continues to be possible (hereinafter referred to as "communicable period"). Thereafter, the controller 920 newly saves or overwrite-saves information representing the set communicable period in the storer 990, and the storer 990 stores the saved information (step S33). In this manner, the alert device 200 updates the information representing the communicable period stored in the storer 990, at the arrival schedule update cycle. In the present modification, the information representing the communicable period includes the information representing the start time of the communicable period and the information representing the end time of the communicable period.

Next, the alert device 200 executes the process described in Modification 1 of the embodiment. Thereby, the alert device 200 acquires the time information representing the scheduled arrival time, from the received arrival schedule information. In addition, the alert device 200 sets the arrival alert start time, based on the scheduled arrival time represented by the acquired time information, and the pre-arrival-schedule alert time. Thus, the alert device 200 sets the time earlier than the scheduled arrival time by the pre-arrival-schedule alert time, as the arrival alert start time.

Next, by executing the process described in Modification 1 of the embodiment, the alert device 200 sets the arrival alert end time, based on the scheduled arrival time and the post-arrival-schedule alert time. Thus, the alert device 200 sets the time later than the scheduled arrival time by the post-arrival-schedule alert time, as the arrival alert end time.

Thereafter, the alert device 200 newly saves or overwrite-saves in the storer 990 the time information representing the scheduled arrival time, the information representing the arrival alert start time, and the information representing the arrival alert end time, and the storer 990 stores the saved information (steps S34 to S36). Then, the alert device 200 repeats the above-described process from the process of step S31. In this manner, the alert device 200 updates, at the arrival schedule update cycle, the time information representing the scheduled arrival time, the information representing the arrival alert start time and the information representing the arrival alert end time stored in the storer 990.

Figure 11A:
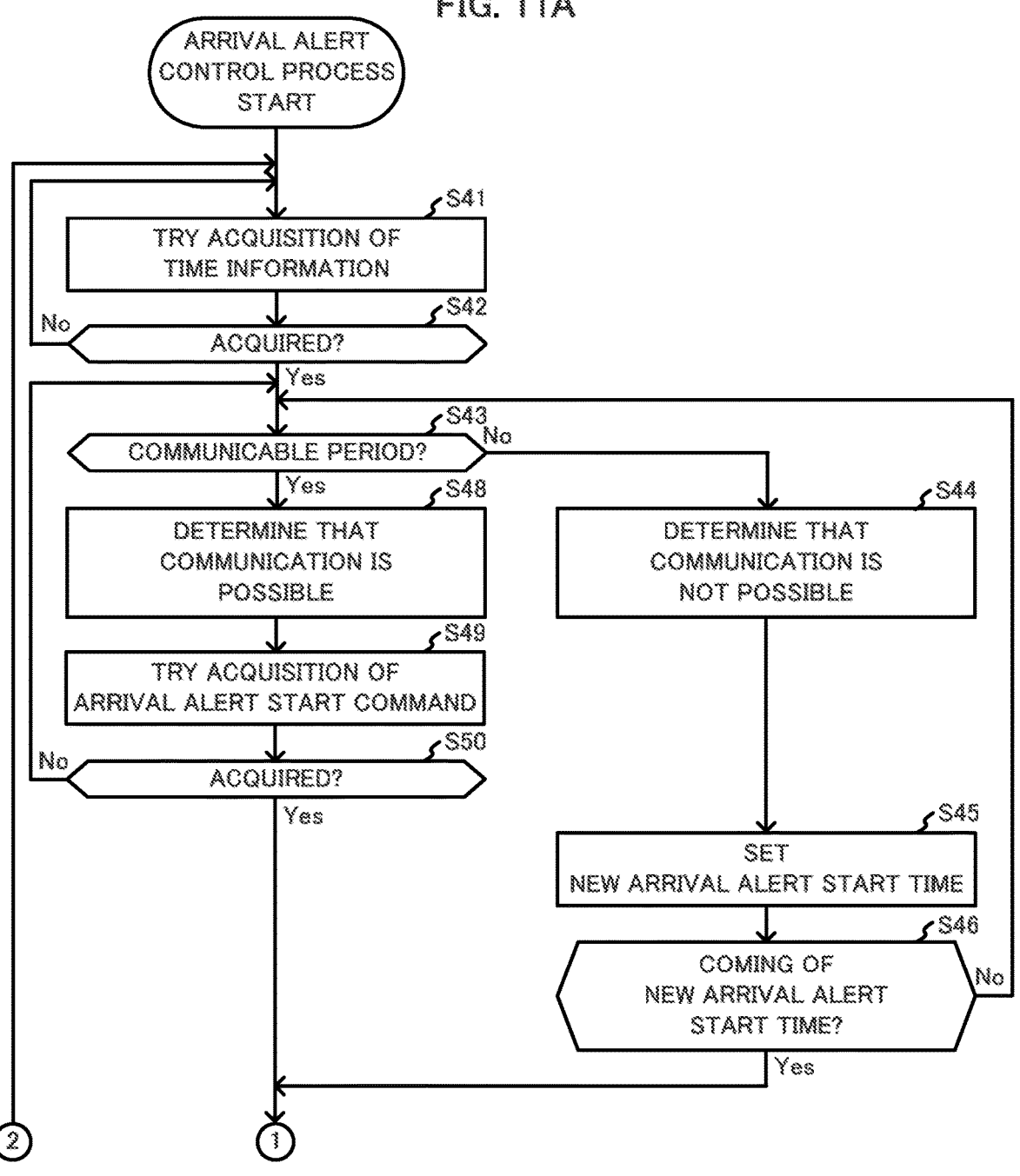
FIG. 11A is a first half of a flowchart illustrating an example of an arrival alert control process that an alert device according to Modification 16 of the embodiment executes.
Figure 11B:
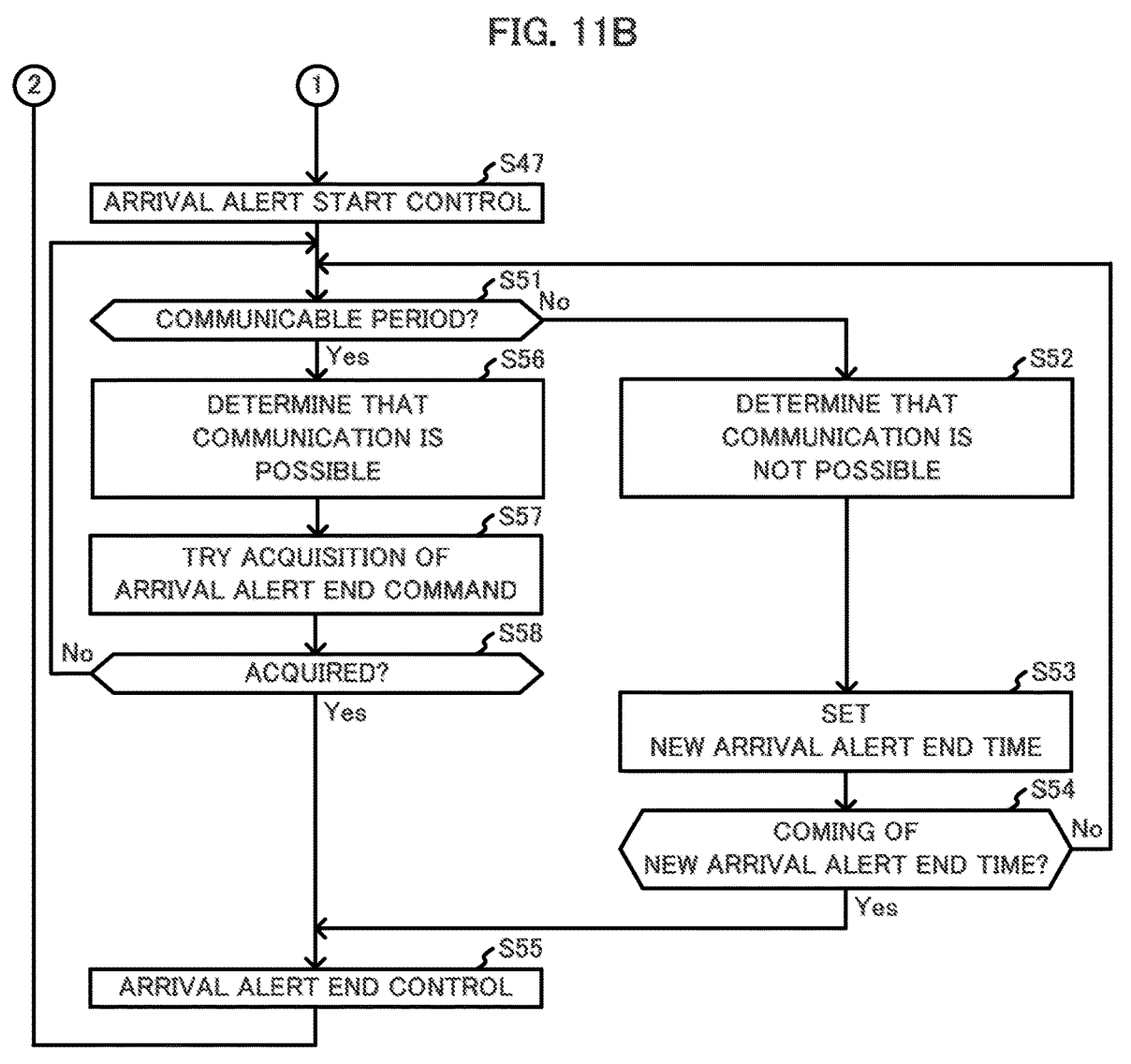

In addition, the alert device 200 according to the present modification, when the alert device 200 is started up, executes, in parallel with the arrival information acquisition process of FIG. 10, an arrival alert control process as illustrated in FIG. 11A and FIG. 11B, the arrival alert control process causing the alertors 231 to 233 to execute the arrival alert. Upon starting the execution of the arrival alert control process, the alert device 200 tries to acquire the time information representing the scheduled arrival time from the storer 990 (step S41). At this time, when the time information is not acquired (step S42; No), the alert device 200 repeats the above-described process from the process of step S41 after a sleep over a predetermined time.

On the other hand, when the time information is acquired (step S42; Yes), the acquirer 910 of the alert device 200 acquires, for example, the information representing the system time from the OS, and the information representing the communicable period from the storer 990. Since the information representing the communicable period stored in the storer 990 is the newly saved or overwrite-saved information, the information that the acquirer 910 acquires from the storer 990 is the information representing the latest communicable period.

Next, the controller 920 of the alert device 200 determines whether or not the system time represented by the acquired information is included in the latest communicable period. At this time, when the system time is a time later than the end time of the latest communicable period, the controller 920 determines that the system time is not included in the latest communicable period. In other words, the controller 920 determines that the latest communicable period has passed (step S43; No). Thus, the controller 920 determines that the communication between the alert device 200 and the alert control device 300 is not possible (step S44).

Next, the controller 920 of the alert device 200 calculates an elapsed time from the end time of the latest communicable period to the system time. Thereafter, the acquirer 910 acquires the information representing the pre-arrival-schedule alert time from the storer 990. Next, the controller 920 corrects the length of the pre-arrival-schedule alert time represented by the acquired information in such a manner as to become longer as the calculated elapsed time is longer. In the present modification, the acquirer 910 acquires information representing a preset positive correction coefficient from the storer 990, and the controller 920 multiplies the calculated elapsed time by the positive correction coefficient represented by the acquired information, and corrects the length of the pre-arrival-schedule alert time before correction in such a manner as to become longer than before the correction by a positive time acquired by the multiplication. However, the correction method of the length of the pre-arrival-schedule alert time is not limited to this. A person skilled in the art can determine a preferable positive correction coefficient by experiments.

The reason why the length of the pre-arrival-schedule alert time is corrected in this manner is as follows. As the elapsed time is longer, an elapsed time from the time when the communication was disabled is longer, and thus the elapsed time from the time when the time information representing the scheduled arrival time was last updated by the alert device 200 is longer. In other words, there is a high probability that as the elapsed time is longer, (i) the arrival time, at which the vehicle 100 actually arrives at the port, becomes earlier than the scheduled arrival time represented by the time information that the alert device 200 stores, and (ii) the difference between the scheduled arrival time and the actual arrival time becomes greater. In other words, even when the actual arrival time becomes earlier than the scheduled arrival time and the difference between the scheduled arrival time and the arrival time becomes greater, the alert device 200 is caused to start the arrival alert at a timing when the vehicle 100 approaches the port, or at a time earlier than this timing.

Thereafter, the controller 920 of the alert device 200 sets a new arrival alert start time, based on the corrected pre-arrival-schedule alert time and the scheduled arrival time. In the present modification, the controller 920 sets, as the new arrival alert start time, a time earlier than the scheduled arrival time by the corrected pre-arrival-schedule alert time (step S45).

Thereafter, by executing the process described in Modification 1 of the embodiment, the controller 920 of the alert device 200 determines whether or not the new arrival alert start time comes, or has already come. At this time, when the system time is a time earlier than the new arrival alert start time, the controller 920 determines that the new arrival alert start time has not yet come (step S46; No). Then, the alert device 200 repeats the above-described process from step S43.

On the other hand, when the system time is a time at or later than the new arrival alert start time, the controller 920 of the alert device 200 determines that the new arrival alert start time comes, or has already come (step S46; Yes). Thereafter, by executing the process described in Modification 1 of the embodiment, the controller 920 executes the arrival alert start control for the alertors 231 to 233 (step S47 of FIG. 11B).

In step S43 of FIG. 11A, when the system time is a time at or earlier than the end time of the latest communicable period, the controller 920 of the alert device 200 determines that the system time is included in the latest communicable period. In other words, the controller 920 determines that the latest communicable period has not passed (step S43; Yes). Thus, the controller 920 determines that the communication between the alert device 200 and the alert control device 300 is possible (step S48).

Next, the acquirer 910 of the alert device 200 tries to acquire the arrival alert start command from the data communication circuit 294a (step S49). At this time, when the arrival alert start command is not acquired (step S50; No), the alert device 200 repeats the above-described process from step S43 after a sleep over a predetermined time. On the other hand, when the arrival alert start command is acquired (step S50; Yes), the alert device 200 executes the arrival alert start control (step S47 of FIG. 11B).

After the arrival alert start control is executed in step S47, the alert device 200 executes a process similar to the process of step S43 of FIG. 11A. Thereby, when the alert device 200 determines that the latest communicable period has passed (step S51 of FIG. 11B; No), the alert device 200 executes a process similar to the process of steps S44 and S45 of FIG. 11A. Thereby, the alert device 200 determines that the communication with the alert control device 300 is not possible (step S52 of FIG. 11B), and sets a new arrival alert end time (step S53).

For this purpose, the alert device 200 calculates an elapsed time from the end time of the latest communicable period to the system time. In addition, the acquirer 910 of the alert device 200 acquires the information representing the post-arrival-schedule alert time from the storer 990. Next, the controller 920 corrects the length of the post-arrival-schedule alert time represented by the acquired information in such a manner as to become longer as the calculated elapsed time is longer.

The reason why the length of the post-arrival-schedule alert time is corrected in this manner is as follows. There is a high probability that as the elapsed time is longer, (i) the arrival time, at which the vehicle 100 actually arrives at the port, becomes later than the scheduled arrival time represented by the time information that the alert device 200 stores, and (ii) the difference between the scheduled arrival time and the actual arrival time becomes greater. In other words, even when the actual arrival time becomes later than the scheduled arrival time and the difference between the scheduled arrival time and the arrival time becomes greater, the alert device 200 can be prevented from terminating the arrival alert before the vehicle 100 arrives at the port after approaching the port.

Thereafter, the controller 920 of the alert device 200 sets a new arrival alert end time, based on the corrected post-arrival-schedule alert time and the scheduled arrival time. In the present modification, the controller 920 sets, as the new arrival alert end time, a time later than the scheduled arrival time by the corrected post-arrival-schedule alert time.

Thereafter, the alert device 200 executes a process similar to the process of step S46 of FIG. 11A. Thereby, when alert device 200 determines that the new arrival alert end time has not come (step S54 of FIG. 11B; No), the alert device 200 repeats the above-described process from step S51. On the other hand, when the controller 920 of the alert device 200 determines that the new arrival alert end time comes, or has already come (step S54; Yes), the controller 920 executes the process described in Modification 1 of the embodiment. Thereby, the controller 920 executes the arrival alert end control for the alertors 231 to 233 (step S55). Thereafter, the alert device 200 repeats the above-described process from step S41 of FIG. 11A.

In step S51 of FIG. 11B, when the alert device 200 determines that latest communicable period has not passed (step S51; Yes), the alert device 200 executes a process similar to the process of steps S48 to S50 of FIG. 11A. Thereby, the alert device 200 determines that the communication with the alert control device 300 is possible (step S56 of FIG. 11B), and tries to acquire the arrival alert end command from the data communication circuit 294a (step S57). At this time, when the arrival alert end command is not acquired (step S58; No), the alert device 200 repeats the above-described process from step S51 after a sleep over a predetermined time. On the other hand, when the arrival alert end command is acquired (step S58; Yes), the alert device 200 executes the arrival alert end control (step S55). Thereafter, the alert device 200 executes the above-described process from step S41 of FIG. 11A.

According to these configurations, the data communication circuit 294a of the alert device 200 tries to receive the heartbeat from the alert control device 300. In addition, the controller 920 of the alert device 200 determines whether or not the communication with the alert control device 300 is possible, based on whether or not the heartbeat is received, and controls the alertors 231 to 233, based on the determination result. Moreover, when the arrival alert start command that commands the start of the execution of the arrival alert is received while the communication is determined to be possible, the controller 920 executes, at the timing of the reception of the arrival alert start command, the arrival alert start control that controls the alertors 231 to 233 in order for causing the alertors 231 to 233 to start the execute the arrival alert. In addition, since the controller 920 does not execute the process of the above-described steps S45 and S46 while the communication is determined to be possible, the controller 920 halts the execution of the arrival alert start control at the timing based on the time information received from the alert control device 300. On the other hand, while the communication is determined to be not possible, when the execution of the arrival alert is not started and the timing based on the time information comes, or has already come, the controller 920 of the alert device 200 executes the arrival alert start control. Thus, when the communication is possible, the alert device 200 can start the execution of the arrival alert at the timing of the command by the alert control device 300, and, when the communication is not possible, the alert device 200 can start the execution of the arrival alert at the timing based on the time information. Therefore, even when the communication with the alert control device 300 is possible or not possible after the alert device 200 receives the time information from the alert control device 300, the alert device 200 can suppress a decrease in accuracy of the arrival alert relating to the vehicle 100.

According to these configurations, in a case where the execution of the arrival alert is not started after the end time of the latest communicable period, the controller 920 of the alert device 200 sets, as the alert start time at which the execution of the arrival alert is executed, the time that becomes earlier than the scheduled arrival time as the elapsed time from the end time of the latest communicable period becomes longer. In addition, when the set alert start schedule time comes, or has already come, the controller 920 executes the arrival alert start control. Thus, even when the elapsed time from the time when the communication was disabled becomes longer, and, as a result, the arrival time, at which the vehicle 100 actually arrives at the port, becomes earlier than the scheduled arrival time, and the difference between the actual arrival time and the scheduled arrival time becomes greater, the alert device 200 can increase the probability that the arrival alert can be started at a timing when the vehicle 100 approaches the port, or at a time earlier than this timing.

Furthermore, according to these configurations, in a case where the execution of the arrival alert is not terminated after the end time of the latest communicable period, the controller 920 of the alert device 200 sets, as the arrival alert end time at which the execution of the arrival alert is terminated, the time that becomes later than the scheduled arrival time as the elapsed time from the end time of the latest communicable period becomes longer. In addition, when the set arrival alert end time comes, or has already come, the controller 920 executes the arrival alert end control. Thus, even when the elapsed time from the time when the communication was disabled becomes longer, and, as a result, the actual arrival time becomes later than the scheduled arrival time, and the difference between the actual arrival time and the scheduled arrival time becomes greater, the alert device 200 can be prevented from terminating the arrival alert before the vehicle 100 arrives at the port after approaching the port.

Modification 17 of the Embodiment

In Modification 16 of the embodiment, the case where the vehicle-related time is the scheduled arrival time was described as a concrete example. In addition, in Modification 16 of the embodiment, the description was given that the alert device 200 halts, while the communication is determined to be possible, the execution of the arrival alert start control at the timing based on the vehicle-related time represented by the received time information. Furthermore, the description was given that the alert device 200 executes the arrival alert start control when, while the communication is determined to be not possible, the execution of the arrival alert is not started and the arrival alert start time that is the timing based on the vehicle-related time comes, or has already come. However, Modification 16 is not limited to this, and, like Modification 4 of the embodiment, the vehicle-related time may be a time earlier than the scheduled arrival time by the pre-arrival-schedule alert time. In this case, the alert device 200 may halt the execution of the arrival alert start control at the vehicle-related time, while the communication is determined to be possible. In addition, in this case, the alert device 200 may execute the arrival alert start control when, while the communication is determined to be not possible, the execution of the arrival alert is not started and the vehicle-related time, or the timing based on the vehicle-related time, comes, or has already come.

In addition, in Modification 16 of the embodiment, in which the case where the vehicle-related time is the scheduled arrival time was described as a concrete example, the description was given that the alert device 200 halts, while the communication is determined to be possible, the execution of the arrival alert end control at the timing based on the vehicle-related time. In addition, the description was given that the alert device 200 executes the arrival alert end control when, while the communication is determined to be not possible, the execution of the arrival alert is not terminated and the arrival alert end time that is the timing based on the vehicle-related time comes, or has already come. However, Modification 16 is not limited to this, and, like Modification 6 of the embodiment, the vehicle-related time may be a time later than the scheduled arrival time by the post-arrival-schedule alert time. In this case, the alert device 200 may halt the execution of the arrival alert end control at the vehicle-related time, while the communication is determined to be possible. In addition, in this case, the alert device 200 may execute the arrival alert end control when, while the communication is determined to be not possible, the execution of the arrival alert is not terminated and the vehicle-related time, or the timing based on the vehicle-related time, comes, or has already come.

Modification 18 of the Embodiment

In Modifications 16 and 17 of the embodiment, the description was given that the alert device 200 halts, while the communication is determined to be possible, the execution of the arrival alert start control at the vehicle-related time or at the timing based on the vehicle-related time, and executes the arrival alert start control at the timing of the reception of the arrival alert start command. Furthermore, the description was given that the alert device 200 executes the arrival alert start control when, while the communication is determined to be not possible, the execution of the arrival alert is not started and the vehicle-related time, or the timing based on the vehicle-related time, comes, or has already come. However, Modifications 16 and 17 are not limited to this, and the alert device 200 may halt, while the communication is determined to be possible, the execution of the departure alert start control at the vehicle-related time or at the timing based on the vehicle-related time, and may execute the departure alert start control at the timing of the reception of the departure alert start command. In addition, the alert device 200 may execute the departure alert start control when, while the communication is determined to be not possible, the execution of the departure alert is not started and the vehicle-related time, or the timing based on the vehicle-related time, comes, or has already come. Besides, Modifications 16 and 17 are not limited to this, and the alert device 200 may halt, while the communication is determined to be possible, the execution of the departure alert end control at the vehicle-related time or at the timing based on the vehicle-related time, and may execute the departure alert end control at the timing of the reception of the departure alert end command. Furthermore, the alert device 200 may execute the departure alert end control when, while the communication is determined to be not possible, the execution of the departure alert is not terminated and the vehicle-related time, or the timing based on the vehicle-related time, comes, or has already come.

Modification 19 of the Embodiment

In the embodiment and Modifications 1 to 18 of the embodiment, the alert system 1 was described as including the vehicle 100; the alert device 200 including the alertors 231 to 233; the alert control device 300; and the vehicle control device 400. However, the embodiment and these modifications are not limited to this, and the alert system 1 according to the present modification includes the vehicle 100, the alert control device 300 and the vehicle control device 400, but does not include the alert device 200. The vehicle 100 according to the present modification includes non-illustrated alertors, and the structures and functions of the alertors of the vehicle 100 are similar to the structures and functions of the alertors 231 to 233 described in Modifications 1 to 18 of the embodiment.

In addition, the hardware of the control device 190 included in the vehicle 100 according to the present modification includes the structures and functions of the hardware of the control device 290 included in the alert device 200 described in the embodiment and Modifications 1 to 18 of the embodiment. Specifically, the CPU 191, RAM 192, ROM 193*a*, flash memory 193*b* and data communication circuit 194*a* of the vehicle 100 include functions similar to the functions included in the CPU 291, RAM 292, ROM 293*a*, hard disk 293*b* and data communication circuit 294*a* of the alert device 200. In addition, the control device 190 of the vehicle 100 according to the present modification further includes a non-illustrated input/output port, and the non-illustrated input/output port of the vehicle 100 includes the structure and function of the input/output port 298 of the alert device 200 described in the embodiment and Modifications 1 to 18 of the embodiment.

Thereby, the CPU 191 of the vehicle 100 functions as a non-illustrated acquirer and a non-illustrated controller, and the flash memory 193*b* of the vehicle 100 functions as a non-illustrated storer. The functions of the acquirer, controller and non-illustrated storer of the vehicle 100 are similar to the functions of the acquirer 910, controller 920 and storer 990 of the alert device 200.

Modification 20 of the Embodiment

Figure 12A:
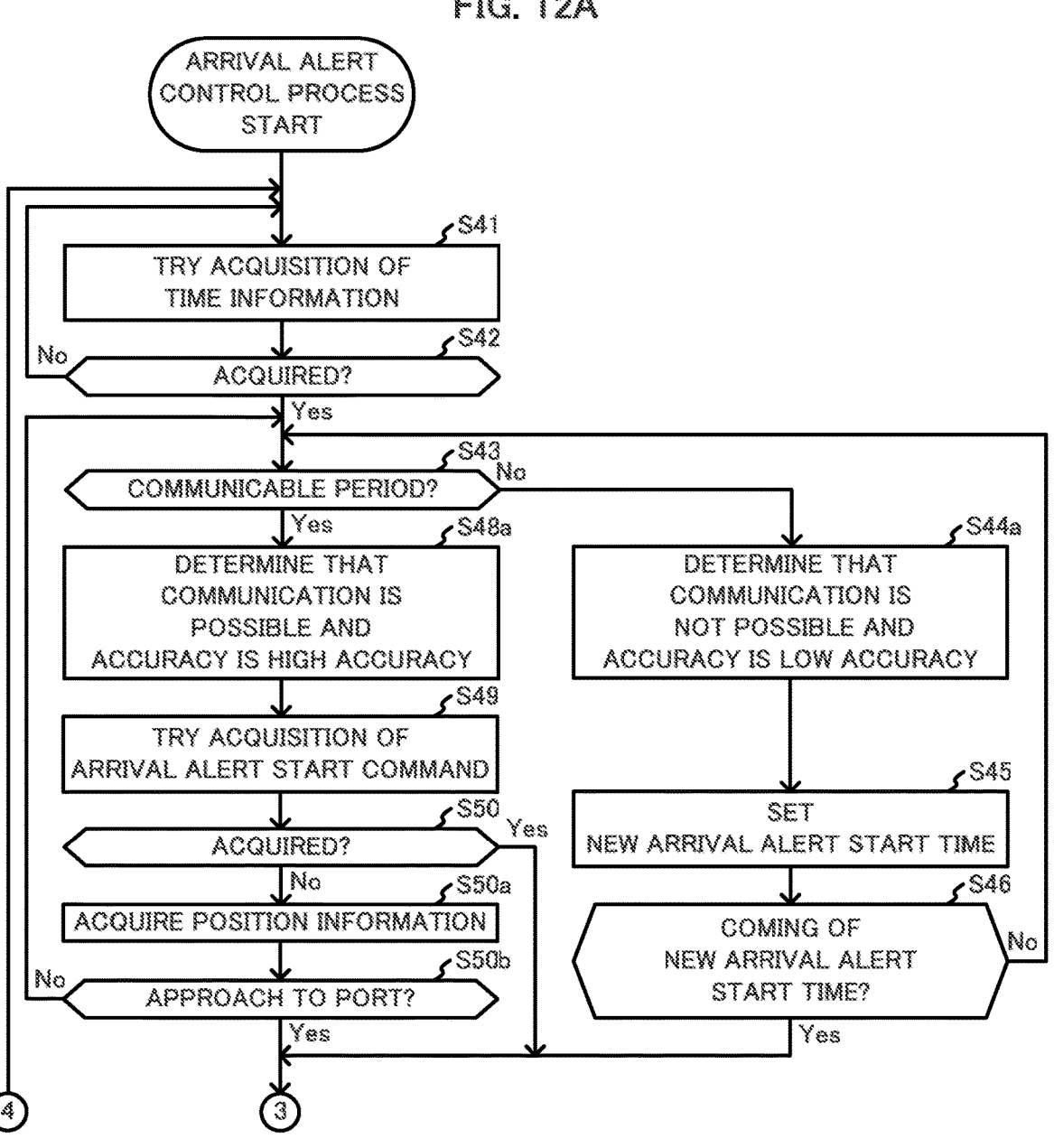
FIG. 12A is a first half of a flowchart illustrating an example of an arrival alert control process that an alert device according to Modification 20 of the embodiment executes.
Figure 12B:
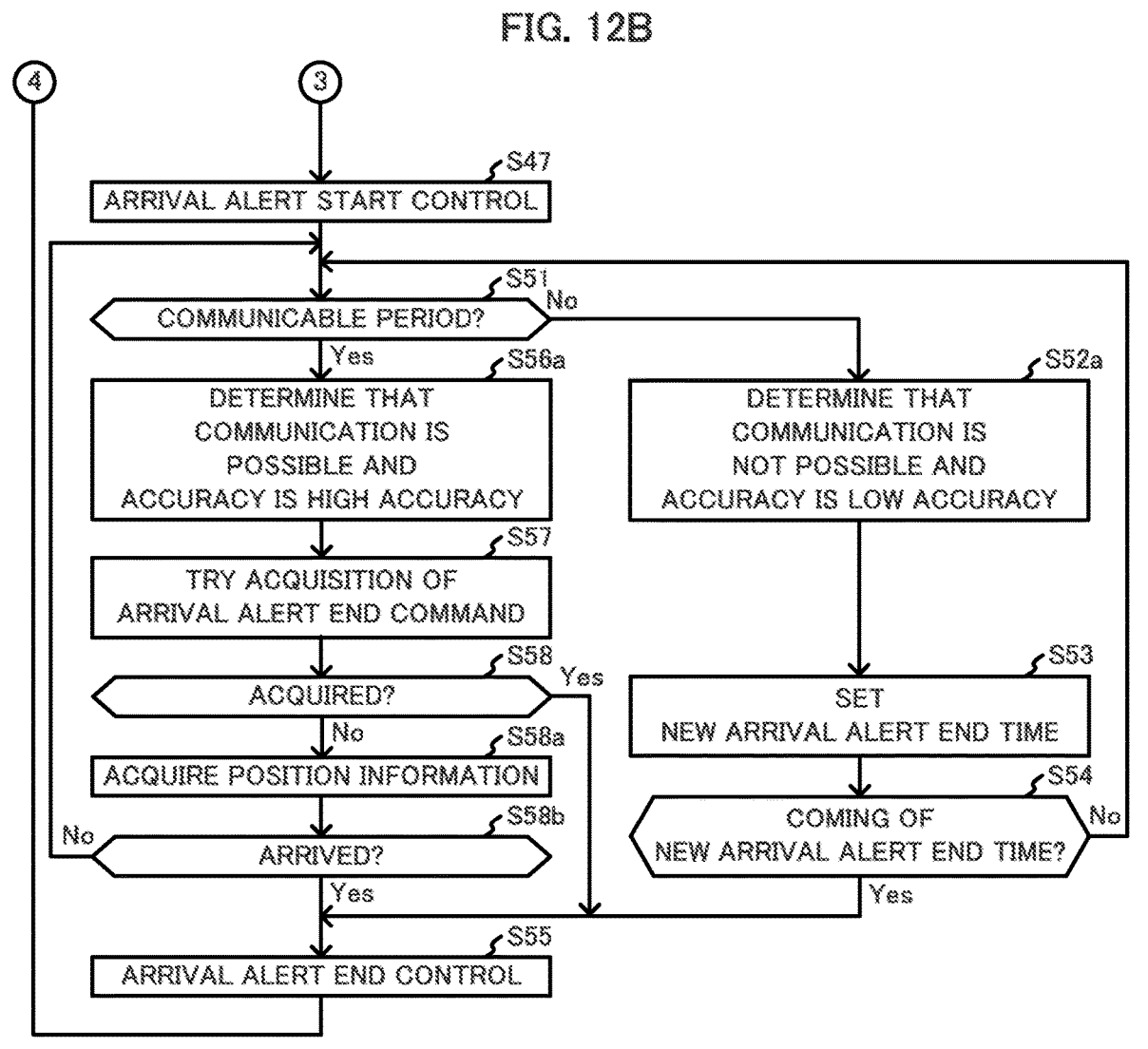

In Modification 19 of the embodiment, the vehicle 100 was described as including the non-illustrated alertors. In addition, in Modification 19 of the embodiment, the description was given that the control device 190 included in the vehicle 100 includes the structures and functions of the hardware of the control device 290 included in the alert device 200 described in Modification 16 or 17 of the embodiment. In other words, the description was given that the control device 190 included in the vehicle 100 includes the functions of executing the arrival alert control process of FIG. 11A and FIG. 11B, which was described in Modification 16 or 17 of the embodiment. However, Modification 19 is not limited to this, and the vehicle 100 according to the present modification executes an arrival alert control process as illustrated in FIGS. 12A and 12B.

Thereby, while the communication with the alert control device 300 is determined to be possible, the non-illustrated controller of the vehicle 100 determines that a measurement accuracy of the position of the vehicle 100 is an accuracy (hereinafter referred to as "high accuracy") that is equal to or higher than a predetermined reference accuracy. On the other hand, while the communication with the alert control device 300 is determined to be not possible, the controller of the vehicle 100 determines that the measurement accuracy of the position of the vehicle 100 is an accuracy (hereinafter "low accuracy") that is lower than the predetermined reference accuracy. In the present modification, that the measurement accuracy of the position is the low accuracy includes that the position cannot be measured, but the present modification is not limited to this, and that the measurement accuracy of the position is the low accuracy may not include that the position cannot be measured.

The reason why the vehicle 100 executes the determination in this manner is as follows. The measurement of the position of the vehicle 100 is executed by the position measuring circuit 196 of the vehicle 100 by using the radio wave emitted from a non-illustrated artificial satellite to the space, and the communication with the alert control device 300 is executed by the data communication circuit 194*a* of the vehicle 100 transmitting and receiving the radio wave emitted to the space to and from the non-illustrated base station. As described in the embodiment, the non-illustrated base station is connected to the alert control device 300 via the network IN.

In other words, the reason for the above is that in a case where the data communication circuit 194*a* of the vehicle 100 is not communicable with the alert control device 300, compared to the case where the communication is possible, the probability is high that an obstacle to shut off not only the radio wave transmitted and received to and from the base station but also the radio wave transmitted from the artificial satellite is present at a position near the vehicle 100. In other words, the reason is that in a case where the communication is not possible, the probability that the measurement accuracy of the position of the vehicle 100 is the low accuracy is higher than a predetermined probability.

In addition, the reason is that in a case where the data communication circuit 194*a* of the vehicle 100 is communicable with the alert control device 300, the probability that such an obstacle is present at a position near the vehicle 100 is lower than in the case where the communication is not possible. In other words, the reason is that in a case where the communication is possible, the probability that the measurement accuracy of the position of the vehicle 100 is the high accuracy is higher than a predetermined probability.

Obstacles that shut off both the radio wave transmitted to and received from the base station and the radio wave transmitted from the artificial satellite include, for example, (a) natural objects including a mountain, and (b) artificial objects including (i) a building and (ii) condominium, and places where such obstacles are present nearby include, for example, (a) a ravine, (b) an inside of a tunnel, and (c) a place surrounded by (i) buildings or (ii) condominiums. However, the obstacles are not limited to these.

The CPU 191 of the vehicle 100, when the vehicle 100 is started up, executes the arrival alert control process as illustrated in FIGS. 12A and 12B. Upon starting the execution of the arrival alert control process, the vehicle 100 executes the process of steps S41 to S43 described in Modification 16 or 17 of the embodiment. Thereby, the acquirer of the vehicle 100 tries to acquire the time information representing the arrival-related time of the vehicle 100 (step S41), and, when the time information is acquired (step S42; Yes), the controller of the vehicle 100 determines whether or not the latest communicable period has passed (step S43). As described in Modification 16 or 17 of the embodiment, the latest communicable period is the period that is set based on the reception time when the data communication circuit 194*a* of the vehicle 100 last received the heartbeat by receiving the radio wave that was emitted from the base station to the space.

At this time, when the controller of the vehicle 100 determines that the latest communicable period has passed (step S43; No), the controller of the vehicle 100 determines that the communication between the vehicle 100 and the alert control device 300 is not possible, and that the measurement accuracy of the position by the position measuring circuit 196 of the vehicle 100 is the low accuracy (step S44*a*).

Next, the vehicle 100 executes the process of steps S45 to S47 described in Modification 16 or 17 of the embodiment. Thereby, the controller of the vehicle 100 sets a new arrival alert start time (step S45), and, upon determining that the new arrival alert start time comes or has already come (step S46; Yes), executes the arrival alert start control (step S47 of FIG. 12B).

In step S43 of FIG. 12A, when the controller of the vehicle 100 determines that the latest communicable period has not passed (step S43; Yes), the controller of the vehicle 100 determines that the communication between the vehicle 100 and the alert control device 300 is possible, and that the measurement accuracy of the position is the high accuracy (step S48a).

Next, the vehicle 100 executes the process of steps S49 and S50 described in Modification 16 or 17 of the embodiment. Thereby, the acquirer of the vehicle 100 tries to acquire the arrival alert start command from the data communication circuit 194a (step S49). Next, when the arrival alert start command is acquired (step S50; Yes), the controller of the vehicle 100 executes the arrival alert start control (step S47 of FIG. 12B).

On the other hand, when the arrival alert start command is not acquired (step S50 of FIG. 12A; No), the acquirer of the vehicle 100 acquires a signal that is output from the position measuring circuit 196, and acquires the position information representing the position of the vehicle 100, based on the acquired signal (step S50a). Next, the controller of the vehicle 100 executes a similar process to the process executed by the alert control device 300 described in Modification 7 of the embodiment. Thereby, based on the acquired position information, the controller of the vehicle 100 determines whether or not the vehicle 100 approaches the port (step S50b).

For this purpose, the controller of the vehicle 100 calculates a movement time that is required for the vehicle 100 to move from the position of the vehicle 100, which is represented by the acquired position information, to the position of the port. Next, when the length of the calculated movement time is greater than the length of the pre-arrival-schedule alert time, the controller determines that, since the vehicle 100 does not approach the port (step S50b; No), a timing for starting the arrival alert (hereinafter referred to as "arrival alert start timing") has not yet come. Thereafter, after a sleep over a predetermined time, the vehicle 100 repeats the above-described process from step S43.

On the other hand, when the length of the calculated movement time is equal to or less than the length of the pre-arrival-schedule alert time, the controller of the vehicle 100 determines that, since the vehicle 100 approaches the port (step S50b; Yes), the arrival alert start timing has come. Then, the controller executes the arrival alert start control (step S47 of FIG. 12B).

After the arrival alert start control is executed, the vehicle 100 executes the process of step S51 described in Modification 16 or 17 of the embodiment. Thereby, when the controller of the vehicle 100 determines that the latest communicable period has passed (step S51; No), the controller of the vehicle 100 determines that the communication between the vehicle 100 and the alert control device 300 is not possible, and that the measurement accuracy of the position is the low accuracy (step S52a).

Next, the vehicle 100 executes the process of steps S53 to S55 described in Modification 16 or 17 of the embodiment. Thereby, the controller of the vehicle 100 sets a new arrival alert end time (step S53), and, upon determining that the new arrival alert end time comes or has already come (step S54; Yes), executes the arrival alert end control (step S55). Thereafter, the vehicle 100 repeats the above-described process from step S41 of FIG. 12A.

In step S51 of FIG. 12B, when the controller of the vehicle 100 determines that the latest communicable period has not passed (step S51; Yes), the controller of the vehicle 100 determines that the communication between the vehicle 100 and the alert control device 300 is possible and that the measurement accuracy of the position is the high accuracy (step S56a).

Next, the vehicle 100 executes the process of steps S57 and S58 described in Modification 16 or 17 of the embodiment. Thereby, the acquirer of the vehicle 100 tries to acquire the arrival alert end command from the data communication circuit 194a (step S57). Next, when the arrival alert end command is acquired (step S58; Yes), the controller of the vehicle 100 executes the arrival alert end control (step S55). Thereafter, the vehicle 100 repeats the above-described process from step S41 of FIG. 12A.

On the other hand, when the arrival alert end command is not acquired (step S58 of FIG. 12B; No), the acquirer of the vehicle 100 acquires the position information representing the position of the vehicle 100, based on the signal output from the position measuring circuit 196 (step S58a). In the present modification, the position information is the information representing the position of the vehicle 100 by the latitude, longitude and altitude. Thus, the controller of the vehicle 100 determines whether or not the vehicle 100 has arrived at the port, based on the altitude of the vehicle 100 represented by the position information (step S58b).

For this purpose, the acquirer of the vehicle 100 acquires, from the storer of the vehicle 100, the position information representing the position of the port by the latitude, longitude and altitude. Next, when the difference between the altitude of the position of the port, which is represented by the acquired position information, and the altitude of the vehicle 100 is greater than a predetermined difference, the controller of the vehicle 100 determines that the vehicle 100 does not arrive at the port since the vehicle 100 does not land on the port (step S58b; No). Then, since the vehicle 100 does not land on the port, the controller of the vehicle 100 determines that the timing of ending the arrival alert (hereinafter referred to as "arrival alert end timing") has not yet come. Thereafter, after a sleep over a predetermined time, the vehicle 100 repeats the above-described process from step S51.

On the other hand, when the difference between the altitude of the position of the port, which is represented by the acquired position information, and the altitude of the vehicle 100 is equal to or less than the predetermined difference, the controller of the vehicle 100 determines that the vehicle 100 has arrived at the port (step S58b; Yes). Thereafter, the controller determines that the arrival alert end timing has come, and executes the arrival alert end control (step S55). Thereafter, the vehicle 100 repeats the above-described process from step S41 of FIG. 12A.

According to these configurations, while the communication with the alert control device 300 is determined to be possible, when the execution of the arrival alert is not started and the arrival alert start command is not received, the controller of the vehicle 100 successively executes the processes of steps S50a and S50b of FIG. 12A and S47 of FIG. 12B. Thereby, the controller executes the arrival alert start control at the timing of determining, based on the position information, that the arrival alert start timing, which is the timing of starting the execution of the arrival alert, has come. Thus, even in a case where the alert control device 300 cannot transmit the arrival alert start command, for example, due to a fault, the vehicle 100 can start the execution of the arrival alert, based on the position information with a high probability that the measurement accuracy is the high accuracy, and therefore a decrease in accuracy of the arrival alert can be suppressed.

In addition, according to these configurations, while the communication with the alert control device 300 is determined to be not possible, the controller of the vehicle 100 does not execute steps S50a and S50b. Thereby, the controller halts the execution of the arrival alert start control at the timing of determining, based on the position information, that the arrival alert start timing has come. Thus, since the vehicle 100 can prevent the execution of the arrival alert from starting, based on the position information with a high probability that the measurement accuracy is the low accuracy, a decrease in accuracy of the arrival alert can be suppressed.

Furthermore, according to these configurations, while the communication with the alert control device 300 is determined to be not possible, the controller of the vehicle 100 determines that the measurement accuracy of the position of the vehicle 100 is the low accuracy. Thus, for example, even in the case where the distance between measured positions does not exceed the maximum movement distance of the vehicle 100 that is determined by the time interval of execution of the measurement and the maximum movement velocity of the vehicle 100, that the measurement accuracy of the position of the vehicle 100 is the low accuracy can be determined with a higher probability than a predetermined probability.

Modification 21 of the Embodiment

In Modification 20 of the embodiment, the description was given that while the communication with the alert control device 300 is determined to be possible, when the execution of the arrival alert is not terminated and the arrival alert end command is not received, the controller of the vehicle 100 determines whether or not the arrival alert end timing has come, based on the position information. In addition, in Modification 20 of the embodiment, the description was given that, in this case, the controller of the vehicle 100 executes the arrival alert end control at the timing of determining, based on the position information, that the arrival alert end timing has come.

However, Modification 20 is not limited to this, and while the communication with the alert control device 300 is determined to be possible, when the execution of the departure alert is not terminated and the departure alert end command is not received, the controller of the vehicle 100 may determine whether or not the timing for ending the execution of the departure alert (hereinafter referred to as "departure alert end timing") has come, based on the position information. In addition, in this case, the controller of the vehicle 100 may execute the departure alert end control at the timing of determining, based on the position information, that the departure alert end timing has come.

In addition, in Modification 20 of the embodiment, the description was given that while the communication with the alert control device 300 is determined to be not possible, the controller of the vehicle 100 halts the execution of the arrival alert end control at the timing of determining, based on the position information, that the arrival alert end timing has come. However, Modification 20 is not limited to this, and while the communication with the alert control device 300 is determined to be not possible, the controller of the vehicle 100 may halt the execution of the departure alert end control at the timing of determining, based on the position information, that the departure alert end timing has come.

Modification 22 of the Embodiment

Figure 13:
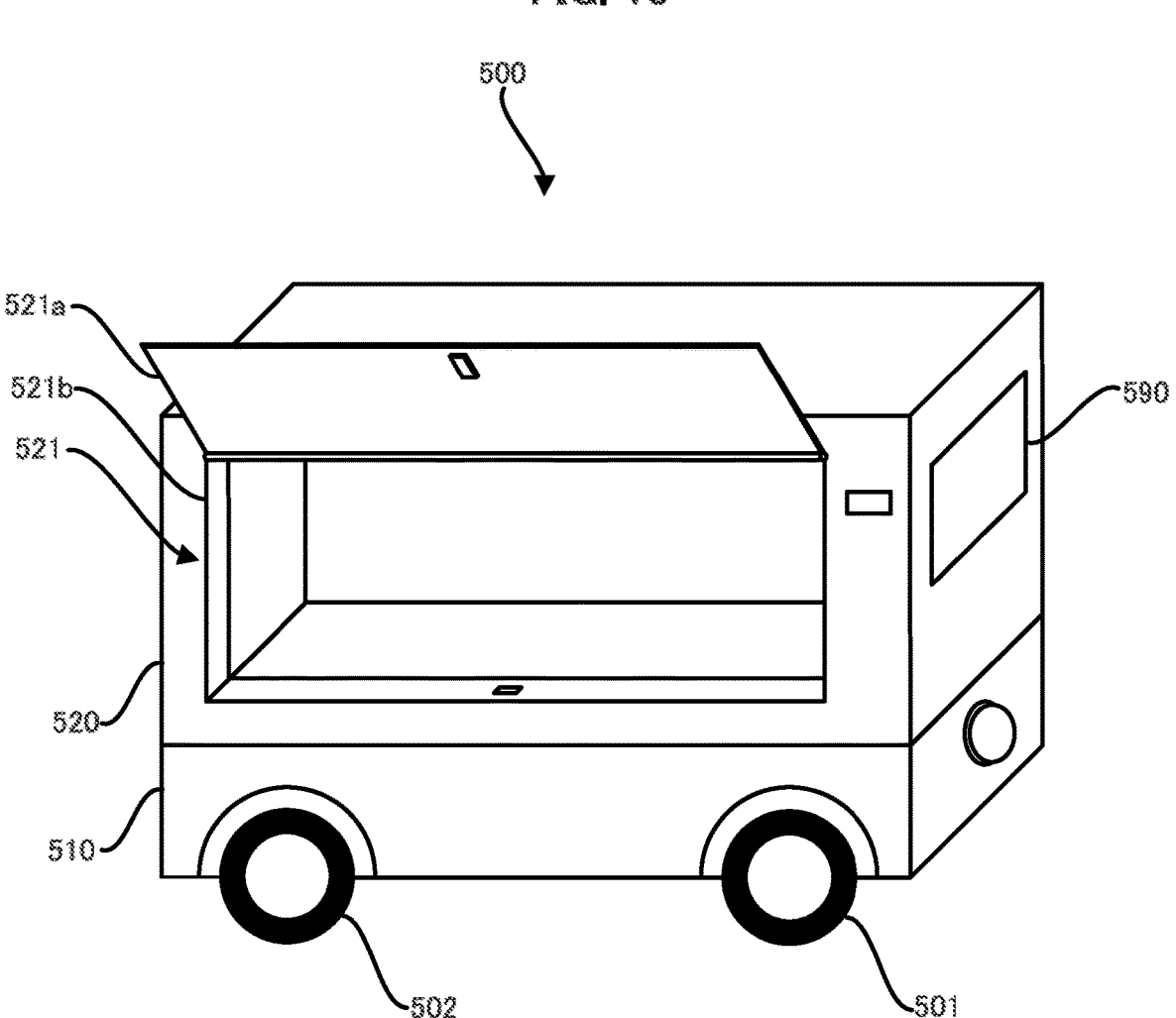
FIG. 13 is an external appearance configuration diagram illustrating one external appearance example of a vehicle according to Modification 22 of the embodiment.

In the embodiment and Modifications 1 to 18 of the embodiment, the description was given that the alert system 1 includes the vehicle 100 that is an unmanned aircraft, and the alert device 200 that executes an alert relating to the vehicle 100. In addition, in Modifications 19 to 21 of the embodiment, the description was given that the alert system 1 includes the vehicle 100 that is an unmanned aircraft and includes alertors, and the alertors of the vehicle 100 execute an alert relating to the vehicle 100. However, the embodiment and these modifications are not limited to this, and the alert system 1 may include a vehicle 500 that is an unmanned ground vehicle, as illustrated in FIG. 13, and an alert device 200 that executes an alert relating to the vehicle 500. Besides, the alert system 1 may include a vehicle 500 that is an unmanned ground vehicle and includes alertors, and the alertors of the vehicle 500 may execute an alert relating to the vehicle 500.

Furthermore, the embodiment and the modifications are not limited to this, and the alert system 1 may include one or more vehicles 100 that are unmanned aircrafts, one or more vehicles 500 that are unmanned ground vehicles, and an alert device 200 that executes an alert relating to the one or more vehicles 100 and one or more vehicles 500. In addition, the alert system 1 may include one or more vehicles 100 each including alertors, and one or more vehicles 500 each including alertors.

The vehicle 500 includes a chassis 510 including a plurality of wheels including wheels 501 and 502; a storage cabinet 520 disposed on an upper surface of the chassis 510; and a control device 590 built in the storage cabinet 520. The storage cabinet 520 of the vehicle 500 includes a storage box 521 that contains an article. A door 521a and a door frame 521b that receives the door 521a are disposed on an opening portion of a box body of the storage box 521.

The control device 590 of the vehicle 500 includes, as hardware, a CPU, a RAM, a ROM, a flash memory, a data communication circuit, an input device, a position measuring circuit, an input/output port, and a driving circuit, these hardware components being not illustrated. The structures and functions of the hardware included in the control device 590 of the vehicle 500 are similar to the structures and functions of the hardware included in the control device 190 of the vehicle 100.

The driving circuit of the vehicle 500 is connected to non-illustrated cables that are connected to non-illustrated motors configured to rotate the wheels. The driving circuit of the vehicle 500 rotates the wheels by driving the motors in accordance with a control signal that is output from the CPU of the vehicle 500.

Modification 23 of the Embodiment

In the embodiment, the vehicle 100 was described as being an unmanned aircraft, but the vehicle 100 is not limited to this, and may be an unmanned flying object. In addition, in the embodiment, the vehicle 100 was described as being a drone that acquires lift force and thrust force by the propellers 111 to 114, but the vehicle 100 is not limited to this. The vehicle 100 may include a wing and may acquire lift force by the wing, or may include a gasbag filled with a gas having a less specific gravity than air and may acquire lift force by the gasbag. Besides, the vehicle 100 may include a jet engine or a rocket engine, and may acquire thrust force by the jet engine or rocket engine.

Modification 24 of the Embodiment

In the embodiment, the description was given that the port is a parking area of (i) a warehouse in which an article to be delivered by the vehicle 100 is stored, or (ii) a store that sells such an article, but the port is not limited to this. The port may be any place on which at least either departure or arrival of the vehicle 100 is scheduled, and may be, for example, a parking area of a delivery destination of an article.

In addition, the port is not limited to a parking area, and may be, for example, (a) an entrance of (i) an apartment house, (ii) an office building, (iii) a hotel, or (iv) a public facility, or (b) a front area of an entrance of a detached house. Besides, the port may be a lobby of (i) an apartment house, (ii) an office building, (iii) a hotel, or (iv) a public facility. Furthermore, the port may be (i) a garden, (ii) a rooftop, or (iii) a veranda of (i) a detached house, (ii) an apartment house, (iii) an office building, (iv) a hotel, or (v) a public facility. Additionally, the port may be (i) a road, (ii) a dry riverbed, (iii) a park, or (iv) a school yard, where landing or taking off of the vehicle 100 is not prohibited.

Modification 25 of the Embodiment

In the embodiment, the description was given that the alert device 200 includes all of the speaker 231, 7-segment display 232 and patlamp 233, and the departure alert is executed by all of the speaker 231, 7-segment display 232 and patlamp 233. In addition, in Modification 1 of the embodiment, the description was given that the alert device 200 includes all of the speaker 231, 7-segment display 232 and patlamp 233, and the arrival alert is executed by all of the speaker 231, 7-segment display 232 and patlamp 233. However, the embodiment and Embodiment 1 are not limited to this, and the alert device 200 may include all of the speaker 231, 7-segment display 232 and patlamp 233, and may execute at least either the departure alert or the arrival alert, by at least one of the speaker 231, 7-segment display 232 or patlamp 233. Additionally, the alert device 200 may include at least one of the speaker 231, 7-segment display 232 or patlamp 233, and may execute at least either the departure alert or the arrival alert, by the at least one of the speaker 231, 7-segment display 232 or patlamp 233. Although the alertor 232 was described as being the 7-segment display, the alertor 232 is not limited to the 7-segment display, and may be a display device including a display panel. Besides, although the alertor 233 was described as being the rotating light, the alertor 233 is not limited to the rotating light, and may be, for example, a projector including a light-emitting diode (LED), a halogen lamp, a mercury lamp, or a metal halide lamp.

Additionally, in the embodiment, the description was given that the departure alert of the vehicle 100 is executed for a person staying at the port from which the departure of the vehicle 100 is scheduled. Furthermore, in Modification 1 of the embodiment, the description was given that the arrival alert of the vehicle 100 is executed for a person staying at the port at which the arrival of the vehicle 100 is scheduled. However, the embodiment and Modification 1 are not limited to this, and at least either the departure alert or the arrival alert may be executed for both a person staying at the port and a person staying at a position near the port, and may be executed for a person staying at a position near the port, and not for a person staying at the port.

Additionally, in the embodiment, the description was given that the alert device 200 executes the alert relating to the departure of the vehicle 100. Furthermore, in Modification 1 of the embodiment, the description was given that the alert device 200 executes the alert relating to the arrival of the vehicle 100. However, the embodiment and Modification 1 are not limited to this, and the alert device 200 may execute at least either a warning relating to the departure of the vehicle 100 or a warning relating to the arrival of the vehicle 100.

In the embodiment and Modification 1 of the embodiment, the description was given that the alert device 200 executes the leaving command alert notifying a person staying at a port that the person is commanded to leave the port, but the embodiment and Modification 1 are not limited to this. The alert device 200 may execute at least one of a leaving command alert, an off-limits alert, a port departure alert, a port arrival alert, or a falling possibility alert. The off-limits alert is an alert notifying that an entrance to the port is prohibited. The port departure alert is an alert notifying at least either a departure schedule of the vehicle 100 from the port, or a departure of the vehicle 100 from the port, and the port arrival alert is an alert notifying at least either an arrival schedule of the vehicle 100 at the port, or an arrival of the vehicle 100 at the port. The falling possibility alert is an alert notifying that the vehicle 100, or at least one of predetermined falling objects, may possibly fall onto the port. The predetermined falling objects include, for example, at least either a part of the vehicle 100, or an article that the vehicle 100 delivers.

Modification 26 of the Embodiment

In Modification 16 of the embodiment, the description was given that the alert control device 300 transmits, as the heartbeat, new arrival schedule information including new time information to the alert device 200. However, the heartbeat is not limited to this, and may be any information. For example, the heartbeat may be a reception report that is, for example, information called ACKnowledgement (ACK) and reports that the alert control device 300 has received state information that is transmitted by the alert device 200 to the alert control device 300 at a heartbeat transmission cycle. The state information includes, for example, a time yet-to-be-set state, a time received state, and an alert-in-progress state. The time yet-to-be-set state is a state in which the alert device 200 does not store time information and the alert device 200 has not yet set the arrival alert start time and the arrival alert end time. The time received state is a state in which the arrival alert has not yet been started after the alert device 200 received the time information. The alert-in-progress state is a state in which the alert device 200 is executing the arrival alert.

Modification 27 of the Embodiment

In the embodiment, the description was given that the hard disk 293*b* of the alert device 200 functions as the storer 990 that stores the time information, the information representing the departure alert start time, and the information representing the departure alert end time. In addition, in Modification 1 of the embodiment, the description was given that the hard disk 293*b* functions as the storer 990 that stores the time information, the information representing the arrival alert start time, and the information representing the arrival alert end time. However, the embodiment and Modification 1 are not limited to this, and any type of storage device or memory with non-volatility, which is included in the alert device 200, may function as the storer 990. Examples of the memory with non-volatility include a flash memory, and examples of the storage device with non-volatility include a floppy disk drive, and an optical disc drive.

When the storer 990 of the alert device 200 has non-volatility, the storer 990 keeps storing, even after restart of the alert device 200, the time information, the information representing the departure alert start time, and the information representing the departure alert end time, which were stored before the restart of the alert device 200. Thus, even in a case where the alert device 200 is restarted while executing the departure alert control process illustrated in FIG. 6, when the alert device 200 executes the departure alert control process once again, the alert device 200 can start the departure alert immediately after the restart in a case where the departure alert start time that was set before the restart has come at the time of the restart, and can start the departure alert at the departure alert start time that was set before the restart in a case where the departure alert start time has not yet come at the time of the restart. In addition, when the departure alert end time that was set before the restart has not yet come at the time of the restart, the alert device 200 can terminate the departure alert at the departure alert end time that was set before the restart. Furthermore, even in a case where the alert device 200 is restarted while executing the non-illustrated arrival alert control process, when the alert device 200 executes the arrival alert control process once again, the alert device 200 can start the departure alert immediately after the restart, or at the arrival alert start time that was set before the restart, and can terminate the arrival alert at the arrival alert end time that was set before the restart.

In the present modification, the description was given that the storage device with non-volatility or the memory with non-volatility included in the alert device 200 functions as the storer 990, but the present modification is not limited to this. The storage device or memory included in the alert device 200, which has volatility and includes, for example, the RAM 292, may function as the storer 990.

Modification 28 of the Embodiment

In Modification 2 of the embodiment, the description was given that the controller 920 of the alert device 200 causes the alertors 231 to 233 to terminate the execution of the departure alert at the departure alert end time, and causes the alertors 231 to 233 to start the execution of the arrival alert at the arrival alert start time. However, Modification 2 is not limited to this, and the controller 920 according to the present modification causes the alertors 231 to 233 to terminate the execution of the departure alert at the departure alert end time, and then causes the alertors 231 to 233 to start the execution of a movement alert. In addition, the controller 920 causes the alertors 231 to 233 to terminate the execution of the movement alert at the arrival alert start time, and then causes the alertors 231 to 233 to start the execution of the arrival alert.

In the present modification, the movement alert is an alert notifying a person staying at the port that the vehicle 100 is moving from the port to the delivery destination, or from the delivery destination to the port. However, the present modification is not limited to this, and the movement alert may be an alert notifying a person staying at the port and a person staying at a position near the port, or may be an alert notifying a person staying at a position near the port, and not a person staying at the port. In addition, the movement alert may be an alert notifying that the vehicle 100 is flying. Besides, the movement alert may be an alert notifying that the vehicle 100 is flying and that non-entrance to the port is recommended, or may be an alert notifying that paying attention to the approach of the vehicle 100 is recommended.

The alertor 231 that is the speaker of the alert device 200 executes the movement alert by outputting a predetermined audio, and the alertor 232 that is the 7-segment display executes the movement alert by displaying at least one of a predetermined character string, character or symbol, including, for example, a character string "BUSY". The alertor 233 that is called "patlamp" executes the movement alert by executing at least either lighting or flickering in accordance with a predetermined pattern.

In the present modification, the alert device 200 was described as executing the movement alert by all of the alertors 231 to 233, but the present modification is not limited to this. The alert device 200 may execute the movement alert by one or two of the alertor 231, alertor 232 or alertor 233.

Modification 29 of the Embodiment

Modifications 19 to 21 of the embodiment, in which the vehicle 100 includes the alertors, and Modification 28 of the embodiment, in which the movement alert is executed, can be combined. In the present modification that is the combination of Modifications 19 to 21 of the embodiment and Modification 28 of the embodiment, the alert system 1 includes the vehicle 100 including the alertors, and the alert device 200 disposed at the position of the port or at a position near the port.

After departing from the port, the vehicle 100 according to the present modification starts the movement along the delivery route. Thereafter, the CPU 191 of the vehicle 100 causes the alertors of the vehicle 100 to terminate the execution of the departure alert at the departure alert end time or at the timing of reception of the departure alert end command. The CPU 291 of the alert device 200, which is disposed at the position of the port or at a position near the port, causes the alertors 231 to 233 to start the movement alert at the departure alert end time or at the timing of reception of the departure alert end command.

Then, after finishing the delivery of an article to the delivery destination, the vehicle 100 departs from the delivery destination and starts moving along the return route. The CPU 291 of the alert device 200 causes the alertors 231 to 233 to terminate the execution of the movement alert at the arrival alert start time or at the timing of reception of the arrival alert start command, and the CPU 191 of the vehicle 100 causes the alertors of the vehicle 100 to start the execution of the arrival alert at the arrival alert start time or at the timing of reception of the arrival alert start command.

Modification 30 of the Embodiment

In the embodiment, the vehicle 100 was described as being the unmanned aircraft. In addition, in Modification 22 of the embodiment, the vehicle 500 was described as being the unmanned ground vehicle. However, the vehicles 100 and 500 may not necessarily be unmanned, and when the vehicles 100 and 500 are autonomously moving objects, excluding control by the vehicle control device 400, the vehicles 100 and 500 may be manned.

The embodiment of the present disclosure and Modifications 1 to 30 of the embodiment can be combined with each other.

There can be provided the alert device 200 including a configuration for implementing the functions according to any one of the embodiment and Modifications 1 to 18, 22 to 28, and 30 of the embodiment, and also there can be provided a system that is constituted by a plurality of devices and includes, as the entirety of the system, a configuration for implementing the functions according to any one of the embodiment and Modifications 1 to 18, 22 to 28, and 30 of the embodiment.

There can be provided the control device 290 including a configuration for implementing the functions according to any one of the embodiment and Modifications 1 to 18, 22 to 28, and 30 of the embodiment, and also there can be provided a system that is constituted by a plurality of devices and includes, as the entirety of the system, a configuration for implementing the functions according to any one of the embodiment and Modifications 1 to 18, 22 to 28, and 30 of the embodiment.

There can be provided the control device 190 including a configuration for implementing the functions according to any one of Modifications 19 to 21, and 29 of the embodiment, and also there can be provided a system that is constituted by a plurality of devices and includes, as the entirety of the system, a configuration for implementing the functions according to any one of the Modifications 19 to 21, and 29 of the embodiment.

There can be provided the control device 290 including in advance a configuration for implementing the functions according to any one of the embodiment of the present disclosure and Modifications 1 to 18, 22 to 28, and 30 of the embodiment. In addition, by applying a program, an existing control device can be caused to function as the control device 290 according to any one of the embodiment and Modifications 1 to 18, 22 to 28, and 30 of the embodiment. In other words, a computer (a CPU or the like) that controls an existing control device executes a program for implementing each functional configuration by the control device 290 exemplarily illustrated in the embodiment and Modifications 1 to 18, 22 to 28, and 30 of the embodiment, thereby being able to cause the existing control device to function as the control device 290 according to any one of the embodiment and Modifications 1 to 18, 22 to 28, and 30 of the embodiment.

There can be provided the control device 190 including in advance a configuration for implementing the functions according to any one of Modifications 19 to 21, and 29 of the embodiment of the present disclosure. In addition, by applying a program, an existing control device can be caused to function as the control device 190 according to any one of Modifications 19 to 21, and 29 of the embodiment. In other words, a computer (a CPU or the like) that controls an existing control device executes a program for implementing each functional configuration by the control device 190 exemplarily illustrated in Modifications 19 to 21, and 29 of the embodiment, thereby being able to cause the existing control device to function as the control device 190 according to any one of Modifications 19 to 21, and 29 of the embodiment.

A method of distributing such a program is freely chosen. For example, the program can be stored in a non-transitory recording medium such as a memory card, a CD (Compact Disc)-ROM, or a DVD (Digital Versatile Disc)-ROM, and distributed, and also the program can be distributed via a communication medium such as the internet.

The method according to the present disclosure can be implemented by using the alert system 1 according to any one of the embodiment and Modifications 1 to 30 of the embodiment. In addition, the method according to the present disclosure can be implemented by using the control device 290 according to any one of the embodiment and Modifications 1 to 18, 22 to 28, and 30 of the embodiment, and the control device 190 according to any one of Modifications 19 to 21, and 29 of the embodiment.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

APPENDIX

Appendix 1

An alert device including:
a communication circuit configured to receive, from a control device, time information representing a vehicle-related time that is a time relating to a vehicle;
a storer that is a memory or a storage device, the storer being configured to store the received time information; and
an alertor configured to execute an alert relating to the vehicle, based on the vehicle-related time represented by the stored time information.

Appendix 2

The alert device according to Appendix 1, further including:
at least one memory configured to store program code; and
at least one processor configured to read out the program code and to operate in accordance with the program code, wherein
the alert relating to the vehicle includes an arrival alert relating to arrival of the vehicle,
the communication circuit is configured to receive, from the control device, an arrival alert start command that commands a start of execution of the arrival alert, and
the program code includes control code configured to cause the at least one processor to execute arrival alert start control at a timing of reception of the arrival alert start command, the arrival alert start control being control of causing the alertor to start the execution of the arrival alert.

Appendix 3

The alert device according to Appendix 1 or 2, wherein
the alert further includes a departure alert relating to departure of the vehicle,
the vehicle-related time includes a departure-related time that is a time relating to a scheduled departure time of the vehicle,

the communication circuit is configured to receive the time information representing the departure-related time from the control device, the storer is configured to store the received time information, and the control code is configured to cause the at least one processor to execute departure alert start control (1) at the departure-related time represented by the stored time information or (2) at a timing based on the departure-related time, the departure alert start control being control of causing the alertor to start execution of the departure alert.

Appendix 4

The alert device according to any one of Appendices 1 to 3, wherein the departure-related time is (1) the scheduled departure time, (2) a time earlier than the scheduled departure time by a predetermined pre-departure-schedule alert time, or (3) a time later than the scheduled departure time by a predetermined post-departure-schedule alert time, and the control code is configured to cause the at least one processor to (1) in a case where the departure-related time is the scheduled departure time, (a) set the time earlier than the departure-related time by the pre-departure-schedule alert time, as a departure alert start time for starting the execution of the departure alert, and (b) cause the alertor to start the execution of the departure alert at the timing based on the departure-related time, by executing the departure alert start control at the departure alert start time, (2) in a case where the departure-related time is the time earlier than the scheduled departure time by the pre-departure-schedule alert time, (a) set the departure-related time as the departure alert start time, and (b) cause the alertor to start the execution of the departure alert at the departure-related time, by executing the departure alert start control at the departure alert start time, or (3) in a case where the departure-related time is the time later than the scheduled departure time by the post-departure-schedule alert time, (a) set, as the departure alert start time, a time earlier than the departure-related time by a total time of the post-departure-schedule alert time and the pre-departure-schedule alert time, and (b) cause the alertor to start the execution of the departure alert at the timing based on the departure-related time, by executing the departure alert start control at the departure alert start time.

Appendix 5

The alert device according to any one of Appendices 1 to 4, wherein the communication circuit is configured to receive a departure alert end command from the control device after the departure of the vehicle, the departure alert end command commanding an end of the execution of the departure alert, and the control code is configured to cause the at least one processor to execute departure alert end control at a timing of reception of the departure alert end command, the departure alert end control being control of causing the alertor to end the execution of the departure alert.

Appendix 6

The alert device according to any one of Appendices 1 to 5, further including a display or a display device, the display or the display device being configured to execute, when the time information is stored, display representing that the time information is being stored.

Appendix 7

The alert device according to any one of Appendices 1 to 6, wherein the vehicle-related time is (1) a scheduled departure time of the vehicle, (2) a time earlier than the scheduled departure time by a predetermined pre-departure-schedule alert time, or (3) a time later than the scheduled departure time by a predetermined post-departure-schedule alert time, the display representing that the time information is being stored includes display of a remaining time from a system time to the scheduled departure time represented by the time information or acquired based on the time information, and the display is configured to, when new time information representing a new vehicle-related time is received while the display of the remaining time is being executed, (1) halt the display of the remaining time, and (2) start display of a new remaining time from the system time to a new scheduled departure time represented by the received new time information or acquired based on the new time information.

Appendix 8

The alert device according to any one of Appendices 1 to 7, further including:

at least one memory configured to store program code; and at least one processor configured to read out the program code and to operate in accordance with the program code, wherein the communication circuit is configured to try reception of a heartbeat from the control device, the program code includes control code configured to cause the at least one processor to (1) determine whether or not communication with the control device is possible, based on whether or not the heartbeat is received, and (2) control the alertor, based on a determination result, and the control code is configured to cause the at least one processor to (1) while the communication is determined to be possible, (a) when an alert start command that commands a start of execution of the alert is received, execute alert start control at a timing of reception of the alert start command, the alert start control being control of causing the alertor to start the execution of the alert, and (b) halt execution of the alert start control at the vehicle-related time represented by the received time information or at a timing based on the vehicle-related time, and (2) while the communication is determined to be not possible, execute the alert start control when the execution of the alert is not started and when the vehicle-related time or the timing based on the vehicle-related time comes, or has already come.

Appendix 9

The alert device according to any one of Appendices 1 to 8, wherein the communication circuit is configured to receive the heartbeat from the control device at a predetermined cycle, and the control code is configured to cause the at least one processor to (1) each time the heartbeat is received, set, as a communicable period in which communication with the control device is possible, a period with a start time being a reception time of the heartbeat and with an end time being a time later than the start time by a predetermined time, and (2) (a) determine that the communication with the control device is not possible when the communicable period that is latest has passed, and (b) determine that the communication with the control device is possible when the communicable period that is latest has not passed.

Appendix 10

The alert device according to any one of Appendices 1 to 9, wherein the control code is configured to cause the at least one processor to, in a case where the execution of the alert is not started after the end time of the communicable period that is latest, (1) set, as an alert start time at which the execution of the alert is started, a time that is earlier than the vehicle-related time as an elapsed time from the end time of the communicable period that is latest is longer, and (2) execute the alert start control when the alert start time that is set comes, or has already come.

Appendix 11

The alert device according to any one of Appendices 1 to 10, wherein the alertor is at least one of (1) a speaker, (2) (a) a 7-segment display or (b) a display device, or (3) (a) a rotating light or (b) a projector.

Appendix 12

The alert device according to any one of Appendices 1 to 11, wherein the display is a 7-segment display.

Appendix 13

The alert device according to any one of Appendices 1 to 12, wherein the display device includes a display panel.

Appendix 14

A system including:

a control device including a communication circuit configured to transmit time information representing a vehicle-related time that is a time relating to a vehicle; and an alert device configured to execute an alert relating to the vehicle, wherein the alert device includes:

a communication circuit configured to receive, from the control device, the time information representing the vehicle-related time;

a storer that is a memory or a storage device, the storer being configured to store the received time information; and an alertor configured to execute the alert relating to the vehicle, based on the vehicle-related time represented by the stored time information.

Appendix 15

The system according to Appendix 14, wherein the alert includes a departure alert relating to departure of the vehicle, the alertor of the alert device is configured to terminate execution of the departure alert when a departure alert end command that commands an end of the execution of the departure alert is received from the control device, the communication circuit of the alert device is configured to transmit, when the execution is terminated, a departure alert end report notifying that the execution of the departure alert is terminated, to the control device, and the communication circuit of the control device is configured to transmit, in a case where the departure alert end report is not received even after a passage of a predetermined time from a time when the departure alert end command is transmitted, a departure alert end operation command that commands an operation of terminating the execution of the departure alert, to a terminal device of an operator (1) staying at a position of the alert device or (2) staying at a position that is distant from the position of the alert device by a distance that is equal to or less than a predetermined distance.

Appendix 16

A vehicle configured to move, including:

a communication circuit configured to receive, from a control device, time information representing a vehicle-related time that is a time relating to the vehicle;

a storer that is a memory or a storage device, the storer being configured to store the received time information; and an alertor configured to execute an alert relating to the vehicle, based on the vehicle-related time represented by the stored time information.

Appendix 17

The vehicle according to Appendix 16, further including:

at least one memory configured to store program code; and at least one processor configured to read out the program code and to operate in accordance with the program code, wherein the communication circuit is configured to try reception of a heartbeat from the control device, the program code includes control code configured to cause the at least one processor to (1) determine whether or not communication with the control device is possible, based on whether or not the heartbeat is received, and (2) control the alertor, based on a determination result, and the control code is configured to cause the at least one processor to (1) while the communication is determined to be possible, (a) when an alert start command that commands a start of execution of the alert is received, execute alert start control at a timing of reception of the alert start command, the alert start control being control of causing the alertor to start the execution of the alert, and (b) halt execution of the alert start control at the vehicle-related time represented by the received time information or at a timing based on the vehicle-related time, and (2) while the communication is determined to be not possible, execute the alert start control when the execution of the alert is not started and when the vehicle-related time or the timing based on the vehicle-related time comes, or has already come.

Appendix 18

The vehicle according to Appendix 16 or 17, further including:

a position measuring circuit configured to (1) receive a radio wave emitted from an artificial satellite to a space, and (2) measure a position of the vehicle, based on the received radio wave, wherein the communication circuit is configured to receive the heartbeat by (1) transmitting position information representing the measured position via a base station by emitting a radio wave to the space, and (2) receiving a radio wave emitted from the base station to the space, the alert start command is a command received from the control device at a timing based on the transmitted position information, and the control code is configured to cause the at least one processor to (1) while the communication is determined to be possible, in a case where the execution of the alert is not started and the alert start command is not received, execute the alert start control at a timing of determining, based on the position information, that an alert start timing has come, the alert start timing being a timing for starting the execution of the alert, and (2) while the communication is determined to be not possible, halt execution of the alert start control at a timing of determining, based on the position information, that the alert start timing has come.

Appendix 19

A method that an alert device, a system or a vehicle executes, the method including:

receiving, from a control device, time information representing a vehicle-related time that is a time relating to the vehicle;

storing the received time information; and executing an alert relating to the vehicle, based on the vehicle-related time represented by the stored time information.

The invention claimed is:

1. An alert device comprising:

a communication circuit configured to receive time information transmitted from a control device, wherein the time information indicates a vehicle-related time;

a storer that is a memory or a storage device, the storer being configured to store the vehicle-related time indicated in the time information received via the communication circuit;

an alertor configured to execute an alert relating to the vehicle;

at least one memory configured to store program code; and at least one processor configured to read out the program code and to operate in accordance with the program code, the program code comprising:

acquiring code configured to cause at least one of the at least one processor to acquire a system time from an operating system of the alert device; and control code configured to cause at least one of the at least one processor to control the alertor to execute the alert based on a temporal comparison of the vehicle-related time indicated in the time information received via the communication circuit and the system time of the alert device.

2. The alert device according to claim 1, wherein the alert relating to the vehicle includes an arrival alert relating to arrival of the vehicle, the communication circuit is configured to receive, from the control device, an arrival alert start command that commands a start of execution of the arrival alert, and wherein the control code is configured to cause the at least one processor to execute an arrival alert start control at a timing of reception of the arrival alert start command, the arrival alert start control causing the alertor to start the execution of the arrival alert.

3. The alert device according to claim 2, wherein the alert further includes a departure alert relating to departure of the vehicle, the vehicle-related time includes a departure-related time that is a time relating to a scheduled departure time of the vehicle, the communication circuit is configured to receive the time information representing the departure-related time from the control device, the storer is configured to store the received time information, and the control code is configured to cause the at least one processor to execute departure alert start control (1) at the departure-related time represented by the stored time information or (2) at a timing based on the departure-related time, the departure alert start control being control of causing the alertor to start execution of the departure alert.

4. The alert device according to claim 3, wherein the departure-related time is (1) the scheduled departure time, (2) a time earlier than the scheduled departure time by a predetermined pre-departure-schedule alert time, or (3) a time later than the scheduled departure time by a predetermined post-departure-schedule alert time, and the control code is configured to cause the at least one processor to (1) in a case where the departure-related time is the scheduled departure time, (a) set the time earlier than the departure-related time by the pre-departure-schedule alert time, as a departure alert start time for starting the execution of the departure alert, and (b) cause the alertor to start the execution of the departure alert at the timing based on the departure-related time, by executing the departure alert start control at the departure alert start time, (2) in a case where the departure-related time is the time earlier than the scheduled departure time by the pre-departure-schedule alert time, (a) set the departure-related time as the departure alert start time, and (b) cause the alertor to start the execution of the departure alert at the departure-related time, by executing the departure alert start control at the departure alert start time, or (3) in a case where the departure-related time is the time later than the scheduled departure time by the post-departure-schedule alert time, (a) set, as the departure alert start time, a time earlier than the departure-related time by a total time of the post-departure-schedule alert time and the pre-departure-schedule alert time, and (b) cause the alertor to start the execution of the departure alert at the timing based on the departure-related time, by executing the departure alert start control at the departure alert start time.

5. The alert device according to claim 3, wherein the communication circuit is configured to receive a departure alert end command from the control device after the departure of the vehicle, the departure alert end command commanding an end of the execution of the departure alert, and the control code is configured to cause the at least one processor to execute departure alert end control at a timing of reception of the departure alert end command, the departure alert end control being control of causing the alertor to end the execution of the departure alert.

6. The alert device according to claim 4, wherein the communication circuit is configured to receive a departure alert end command from the control device after the departure of the vehicle, the departure alert end command commanding an end of the execution of the departure alert and the control code is configured to cause the at least one processor to execute departure alert end control at a timing of reception of the departure alert end command, the departure alert end control being control of causing the alertor to end the execution of the departure alert.

7. The alert device according to claim 1, further comprising a display or a display device, the display or the display device being configured to execute, when the time information is stored, display representing that the time information is being stored.

8. The alert device according to claim 2, further comprising a display or a display device, the display or the display device being configured to execute, when the time information is stored, display representing that the time information is being stored.

9. The alert device according to claim 7, wherein the vehicle-related time is (1) a scheduled departure time of the vehicle, (2) a time earlier than the scheduled departure time by a predetermined pre-departureschedule alert time, or (3) a time later than the scheduled departure time by a predetermined post-departure-schedule alert time, the display representing that the time information is being stored includes display of a remaining time from the system time to the scheduled departure time represented by the time information or acquired based on the time information, and the display is configured to, when new time information representing a new vehicle-related time is received while the display of the remaining time is being executed, (1) halt the display of the remaining time, and (2) start display of a new remaining time from the system time to a new scheduled departure time represented by the received new time information or acquired based on the new time information.

10. The alert device according to claim 1, wherein the communication circuit is configured to try reception of a heartbeat from the control device, wherein the control code is configured to cause the at least one processor to (1) determine whether or not communication with the control device is possible, based on whether or not the heartbeat is received, and (2) control the alertor, based on a determination result, and wherein the control code is further configured to cause the at least one processor to;

(1) while the communication is determined to be possible, (a) when an alert start command that commands a start of execution of the alert is received, execute alert start control at a timing of reception of the alert start command, the alert start control being control of causing the alertor to start the execution of the alert, and (b) halt execution of the alert start control at the vehicle-related time represented by the received time information or at a timing based on the vehicle-related time, and (2) while the communication is determined to be not possible, execute the alert start control when the execution of the alert is not started and when the vehicle-related time or the timing based on the vehicle-related time comes, or has already come.

11. The alert device according to claim 10, wherein the communication circuit is configured to receive the heartbeat from the control device at a predetermined cycle, and the control code is configured to cause the at least one processor to (1) each time the heartbeat is received, set, as a communicable period in which communication with the control device is possible, a period with a start time being a reception time of the heartbeat and with an end time being a time later than the start time by a predetermined time, and (2) (a) determine that the communication with the control device is not possible when the communicable period that is latest has passed, and (b) determine that the communication with the control device is possible when the communicable period that is latest has not passed.

12. The alert device according to claim 11, wherein the control code is configured to cause the at least one processor to, in a case where the execution of the alert is not started after the end time of the communicable period that is latest, (1) set, as an alert start time at which the execution of the alert is started, a time that is earlier than the vehicle-related time as an elapsed time from the end time of the communicable period that is latest is longer, and (2) execute the alert start control when the alert start time that is set comes, or has already come.

13. The alert device according to claim 1, wherein the alertor is at least one of (1) a speaker, (2) (a) a 7-segment display or (b) a display device, or (3) (a) a rotating light or (b) a projector.

14. The alert device according to claim 7, wherein the display is a 7-segment display.

15. The alert device according to claim 14, wherein the display device includes a display panel.

16. The alert device according to claim 8, wherein the display is a 7-segment display.

17. The alert device according to claim 16, wherein the display device includes a display panel.

18. A system comprising:

a control device including a communication circuit configured to transmit time information representing a vehicle-related time; and an alert device configured to execute an alert relating to the vehicle, wherein the alert device comprises:

a communication circuit configured to receive the time information transmitted from the control device, wherein the time information indicates the vehicle-related time;

a storer that is a memory or a storage device, the storer being configured to store the vehicle-related time indicated in the time information received via the communication circuit;

an alertor configured to execute the alert relating to the vehicle at least one memory configured to store program code; and at least one processor configured to read out the program code and to operate in accordance with the program code, the program code comprising:

acquiring code configured to cause at least one of the at least one processor to acquire a system time from an operating system of the alert device; and control code configured to cause at least one of the at least one processor to control the alertor to execute the alert based on a temporal comparison of the vehicle-related time indicated in the time information received via the communication circuit and the system time of the alert device.

19. The system according to claim 18, wherein the alert includes a departure alert relating to departure of the vehicle, the alertor of the alert device is configured to terminate execution of the departure alert when a departure alert end command that commands an end of the execution of the departure alert is received from the control device, the communication circuit of the alert device is configured to transmit, when the execution is terminated, a departure alert end report notifying that the execution of the departure alert is terminated, to the control device, and the communication circuit of the control device is configured to transmit, in a case where the departure alert end report is not received even after a passage of a predetermined time from a time when the departure alert end command is transmitted, a departure alert end operation command that commands an operation of terminating the execution of the departure alert, to a terminal device of an operator (1) staying at a position of the alert device or (2) staying at a position that is distant from the position of the alert device by a distance that is equal to or less than a predetermined distance.

20. A method that an alert device, a system or a vehicle executes, the method comprising:

receiving time information from a control device via a communication circuit, wherein the time information indicates a vehicle-related time;

storing the vehicle-related time indicated in the time information received via the communication circuit;

acquiring a system time from an operating system of the alert device; and executing an alert relating to the vehicle, based on a temporal comparison of the vehicle-related time indicated in the time information received via the communication circuit and the system time of the alert device.

* * * * *